(12) United States Patent
Gupta

(10) Patent No.: US 9,627,953 B1
(45) Date of Patent: Apr. 18, 2017

(54) BUOYANCY TURBINE

(71) Applicant: Krishendu Das Gupta, Bangalore (IN)

(72) Inventor: Krishendu Das Gupta, Bangalore (IN)

(*) Notice: Subject to any disclaimer, the term of this patent is extended or adjusted under 35 U.S.C. 154(b) by 941 days.

(21) Appl. No.: 13/947,068

(22) Filed: Jul. 21, 2013

(51) Int. Cl.
*F04D 27/02* (2006.01)
*H02K 99/00* (2014.01)
*F03B 17/02* (2006.01)
*F03B 17/06* (2006.01)

(52) U.S. Cl.
CPC .......... *H02K 57/003* (2013.01); *F03B 17/02* (2013.01); *F03B 17/06* (2013.01); *F03B 17/066* (2013.01); *F03B 17/068* (2013.01)

(58) Field of Classification Search
CPC .......... F03B 17/04; F03B 17/02; F03B 7/006; F03B 9/00; F03B 11/002; F03B 11/004; F03B 15/04; F03B 17/065; F03B 17/066; F03B 17/067; F03B 17/068; H02K 57/003
USPC ........... 416/84, 85, 86; 290/52, 1 R; 60/496, 60/675
See application file for complete search history.

(56) References Cited

U.S. PATENT DOCUMENTS

| | | | | |
|---|---|---|---|---|
| 3,466,866 A | * | 9/1969 | Eschenfeld | F03B 17/04 60/496 |
| 4,089,550 A | * | 5/1978 | Denton | F16L 27/0816 285/276 |
| 6,644,026 B2 | * | 11/2003 | Shimshi | F03B 17/005 60/495 |
| 8,225,605 B1 | * | 7/2012 | Harper | F03B 17/02 60/495 |
| 2012/0274079 A1 | * | 11/2012 | McCoy | H02K 7/1823 290/1 R |

* cited by examiner

*Primary Examiner* — Eric Keasel
*Assistant Examiner* — Jason Mikus
(74) *Attorney, Agent, or Firm* — Michael D. Eisenberg

(57) ABSTRACT

A turbine is provided having one or more vanes joined to respective balloons. Compressed or pumped gas entering the turbine is selectively directed toward desired balloons by selectively activating one or more input valves, in order to selectively inflate the balloons. Simultaneously, gas inside the balloons is selectively directed away from the balloons and out of the turbine by selectively activating one or more output valves, in order to selectively deflate the balloons. The turbine is configured for being at least partially submerged in a liquid. The selective inflation of the balloons generates buoyancy which pushes the balloons upward, thereby causing the turbine to rotate. The selective deflation of the balloons decreases buoyancy which may counter the turbine's rotation. The turbine's rotation can be converted to a desired form of energy via a suitable energy converter.

20 Claims, 16 Drawing Sheets

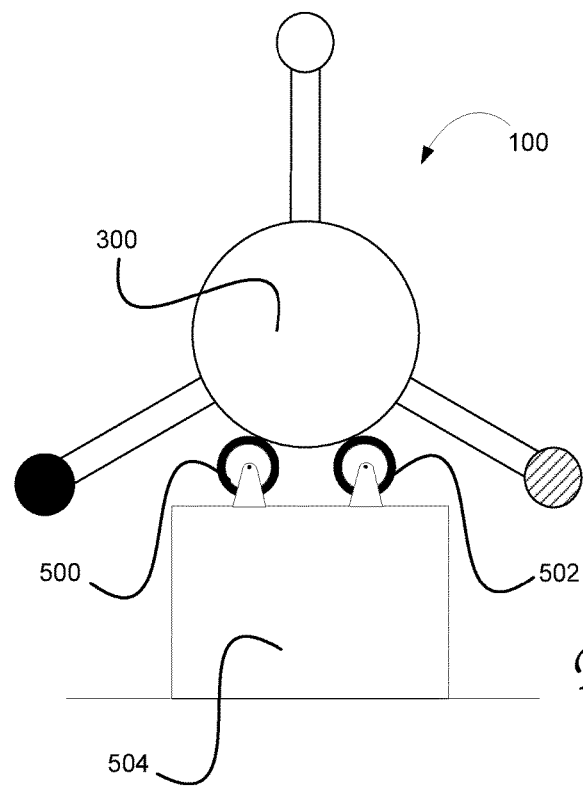
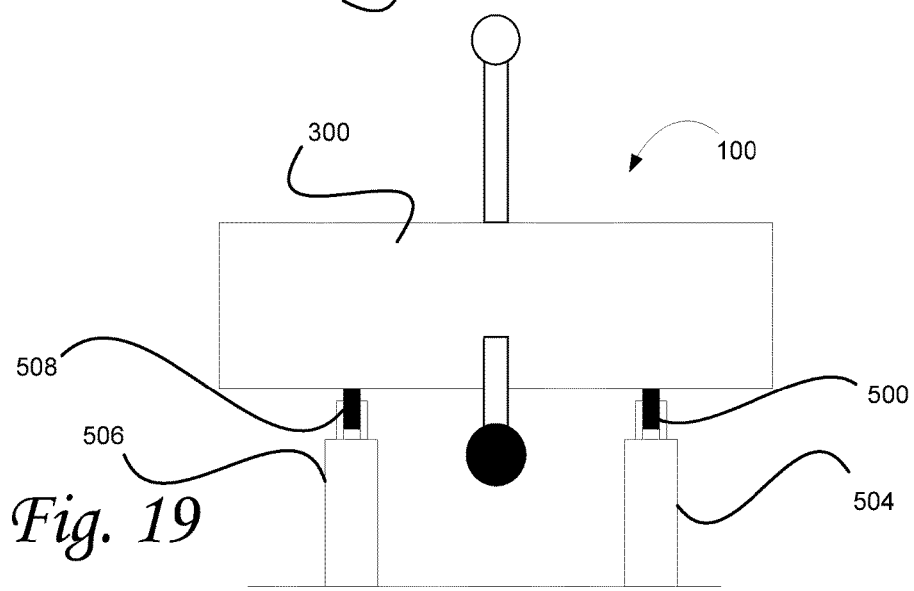

BUOYANCY TURBINE

TECHNICAL FIELD

The present invention, in some embodiments thereof, relates to a system for converting stored energy into motion, and more specifically, to a system for converting a compressed or pumped gas into motion and optionally into electrical energy.

BACKGROUND OF THE INVENTION

Because of environmental concerns, green (alternative) energy production has gained popularity. With increased research and funds being dedicated to green energy, major improvements have been made in the fields of solar-based, wind-based and ocean wave-based power generation technologies, bringing about an increase in their efficiency and a decrease in the cost of the power produced by such technologies. However, solar-based, wind-based and ocean-based power generation technologies cannot produce electrical energy at all times, as they depend on external conditions which are not always available, such as sunlight, wind or waves. Therefore, the use of these alternative energy technologies is limited to specific times of the day or year.

In order to make energy produced by solar, wind or wave based systems available at all times, battery banks are used to store the produced energy, and supply it at will. Battery banks, however, are expensive to buy and maintain, and therefore their operation increases the cost of power production. Additionally, the manufacture of most batteries is generally not a carbon-neutral process, thus bringing about negative environmental impact and staining the clean energy production of green energy technologies.

BRIEF SUMMARY OF EMBODIMENTS OF THE INVENTION

The inventor has found that energy produced by green power production technologies (and any other technologies, for the matter) may be used to compress a gas (e.g. air). The compressed gas can be stored cheaply and with decreased impact to the environment. Once stored, the compressed gas is available for use, even at times when green power production systems are not operational. Therefore, there is a need for a system for using compressed air to generate motion, and subsequently electrical energy.

The present invention relates to a turbine having one or more vanes, each vane being joined to a respective inflatable balloon. The turbine has an inlet, for receiving a compressed gas, and an outlet for releasing the compressed gas. At the inlet, a first timing unit actuates a first group of valves to selectively conduct the compressed gas to one or more desired inflatable balloons joined to respective vanes. At the outlet, a second timing unit actuates a second group of valves to cause the release of the gas from one or more desired balloons and out of the turbine. The turbine is configured to be at least partially immersed in a liquid (e.g. water). When an inflated balloon is in the liquid, its buoyancy will produce a torque in a first direction along its cylindrical axis, applied to the turbine, thus causing the turbine to turn in the first direction, imparting kinetic energy to the turbine. The kinetic energy can be converted to electrical energy, for example via an alternator.

The first and second timing devices are synchronized to inflate balloons immersed in the liquid when the corresponding vanes are at a first predetermined position in order to produce a torque which turns the turbine in a first direction, and to deflate balloons when the balloons are at a second predetermined position in order to prevent or decrease production of a torque in a second direction opposite to the first direction. By selecting suitable first and second positions, the rotation of the turbine can be maximized, therefore maximizing the production of electrical energy.

It should be noted that the turbine of the present invention may also be powered by pumped gas and not just compressed gas. Pumped air can be used as non-flammable, non-polluting fuel in ecologically sensitive areas to generate electricity.

It should be noted that in the present document, the term "balloon" refers any device which is inflatable by driving a gas thereinto, and which deflates when the device is in fluid communication with an environment having a pressure which is smaller than the pressure in the device, thus ejecting the gas toward the lower-pressure environment. In a variant, the balloon is made of compliant material, thus expanding as gas is driven therethrough. In another variant, the balloon is substantially non-compliant after having reached a certain size.

Therefore, an aspects of some embodiments of the present invention, relates to a turbine comprising a vane, an inflatable balloon, an inlet, a conduit, an inlet valve, an inlet timing unit, an outlet, an outlet valve, and an outlet timing unit. The vane is rotatable about a rotation axis of the turbine. The inflatable balloon is joined to the vane and traces a circular path as the vane rotates. The inlet is configured for receiving gas driven therethrough. The conduit is in fluid communication with the inlet and the balloon, and is configured for leading the gas from the inlet to the balloon to inflate the balloon. The inlet valve is configured for selectively enabling and preventing passage of the gas through the conduit to the balloon. The inlet timing unit is configured for selectively actuating the inlet valve to enable passage of the gas to the balloon at one or more first desired times, in order to inflate the balloon at the one or more first desired times. The outlet is in fluid communication with the balloon, for enabling release of the gas from the balloon, in order to deflate the balloon. The outlet valve is configured for selectively enabling and preventing passage of the gas from the balloon to the outlet. The outlet timing unit is configured for selectively actuating the outlet valve to enable passage of the gas from the balloon to the outlet at one or more second desired times, in order to deflate the balloon at the one or more second desired times.

In a variant, the turbine is configured for being at least partially submerged in a liquid, such that the balloon is submerged in the liquid when the balloon is located in at least a part of the circular path. The inlet timing unit and the outlet timing unit are configured for being synchronized for selectively causing the inflation and deflation of the balloon, in order to selectively generate buoyancy of the balloon in the liquid, the buoyancy being applied to the vane to move the vane, causing a rotation of the turbine.

In another variant, the turbine further comprises a converter configured for converting the rotation of the turbine into a desired form of energy.

Optionally, the converter comprises an alternator configured for converting the rotation of the turbine into electrical energy.

In yet another variant, the turbine includes: a plurality of vanes having respective orientations with respect to the turbine's axis of rotation; a plurality of inflatable balloons, each balloon being joined to a respective vain; a plurality of conduits, each conduit being in fluid communication with the inlet and a respective balloon and configured for leading the gas from the inlet to the respective balloon to inflate the respective balloon; a plurality of inlet valves, each inlet valve being configured for enabling or preventing passage of the gas through a respective conduit to a respective balloon; a plurality of outlets in fluid communication with respective balloons, for enabling release of the gas from the respective balloons in order to deflate the respective balloons; a plurality of outlet valves, each outlet valve being configured for enabling or preventing passage of the gas from a respective balloon to a respective outlet. The inlet timing unit is configured for selectively actuating one or more inlet valves, to enable passage of the gas to one or more balloons at first desired times, in order to inflate one or more balloons at first desired times. The outlet timing unit is configured for selectively actuating one or more outlet valves, to enable passage of the gas from one or more balloons to one or more outlets at second desired times, in order to deflate one or more balloons at second desired times.

Optionally, the turbine includes a combined outlet, the plurality of outlets converging into the combined outlet to release the gas from the turbine.

In a further variant, the turbine has a central body extending along the turbine's axis of rotation.

Optionally, the turbine includes: a set of vanes arranged at spaced apart locations along the central body on an axis parallel to the turbine's axis of rotation, all the vanes of the set having a single angular orientation with respect to the turbine's axis of rotation; and a plurality of inflatable balloons, each balloon being joined to a respective vane. The balloons joined to the vanes of the set are in fluid communication with the inlet valve, such that the inlet valve is configured for selectively enabling and preventing passage of the gas to the plurality of balloons. The balloons joined to the vanes of the set are in fluid communication with the outlet valve, such that the outlet valve is configured for selectively enabling and preventing passage of the gas from the plurality of balloons to the outlet.

Optionally, the turbine includes: a plurality of sets of vanes, each set of vanes being arranged along a respective axis parallel to the turbine's axis of rotation, and the vanes of each set having a respective angular orientation with respect to the turbine's axis of rotation; a plurality of inflatable balloons, each balloon being joined to a respective vane; a plurality of inlet valves, each inlet valve corresponding to a respective set, and being configured for enabling or preventing passage of the gas from the conduit to the balloons joined to the vanes of the respective set; a plurality of outlets, each outlet corresponding to a respective set and being in fluid communication with balloons joined to the vanes of the respective set, the outlets being configured for enabling release of the gas from the respective balloons; a plurality of outlet valves, each outlet valve corresponding to a respective set and being configured for enabling or preventing passage of the gas from balloons joined to the vanes of the respective set to the respective outlet. The inlet timing unit is configured for selectively actuating one or more inlet valves, in order to inflate the balloons joined to one or more desired sets of vanes at first desired times. The outlet timing unit is configured for selectively actuating one or more outlet valves, in order to deflate the balloons joined to one or more desired sets of vanes at second desired times.

In yet a further variant, the turbine includes a hollow connector having a first end and a second end, the connector being configured for receiving a non-rotating outlet of a supply of gas via the first end and for receiving the inlet of the turbine via the second end, to enable passage of the gas from the non-rotating outlet to the inlet, which rotates with the turbine.

Optionally, the central body is cylindrical and the cylindrical central body's central axis corresponds to the turbine's axis of rotation.

The turbine may include a support system which comprises a first platform holding a first pair of rollers, and a second platform holding a second pair of rollers. The platforms are placed at different location along a length of the cylindrical central body so as not to touch the vane, and the rollers are configured for supporting the central body, to keep the central body horizontal and to enable the central body to rotate about the central body's central axis.

In a variant, the inlet valve comprises an actuator in form of a lever, the lever being in a pressed configuration when a force is applied on the lever and for being in an unpressed configuration when no force is applied on the lever. The inlet valve is configured to be closed preventing passage of the gas from the inlet to the balloon when the lever is in the unpressed configuration, and to be open enabling passage of the gas from the inlet to the balloon when the lever is in the pressed configuration.

Optionally, the inlet timing unit comprises a first cam located in a vicinity of the inlet valve, the first cam comprising a first curved board located at a desired distance from the axis of rotation of the turbine, such that the lever of the inlet valve contacts the first curved board and is pressed by the first curved board to open the inlet valve, when the balloon is in a desired location along the circular path.

The lever may be joined to a roller, the roller being configured to roll while traveling along the first curved board.

In another variant, the outlet valve comprises an actuator in form of a lever, the lever being in a pressed configuration when a force is applied on the lever and for being in an unpressed configuration when no force is applied on the lever. The outlet valve is configured to be closed preventing passage of the gas from the balloon to the outlet when the lever is in the unpressed configuration, and to be open enabling passage of the gas from the balloon to the outlet when the lever is in the pressed configuration.

Optionally, the outlet timing unit comprises a second cam located in a vicinity of the outlet valve, the second cam comprising a second curved board located at a desired distance from the axis of rotation of the turbine, such that the lever of the outlet valve contacts the second curved board and is pressed by the second curved board to open the outlet valve, when the balloon is in a desired location along the circular path.

The lever may be joined to a roller, the roller being configured to roll while traveling along the second curved board.

According to some embodiments of the present invention, there is provided a method for rotating a turbine having one or more vanes rotatable about an axis of rotation and at one or more inflatable balloons, each balloon being joined to a respective vane, the method comprising: at least partially immersing the turbine in a liquid; receiving a gas into the turbine; selectively conducting the gas to one or more of the balloons, thereby selectively inflating one or more of the balloons; selectively conducting the gas away from one or more of the balloons and out of the turbine, thereby selectively deflating one or more of the balloons.

Optionally, the step of selectively conducting the gas to one or more of the balloons comprises generating buoyancy that moves one or more of the vanes, causing the turbine to rotate in a first direction. The step of selectively conducting the gas away from one or more of the balloons may comprise preventing generation of buoyancy which counters the rotation of the turbine in the first direction.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 18 and 19 illustrate a front and a side view of a turbine of the present invention, which is supported by rollers;

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
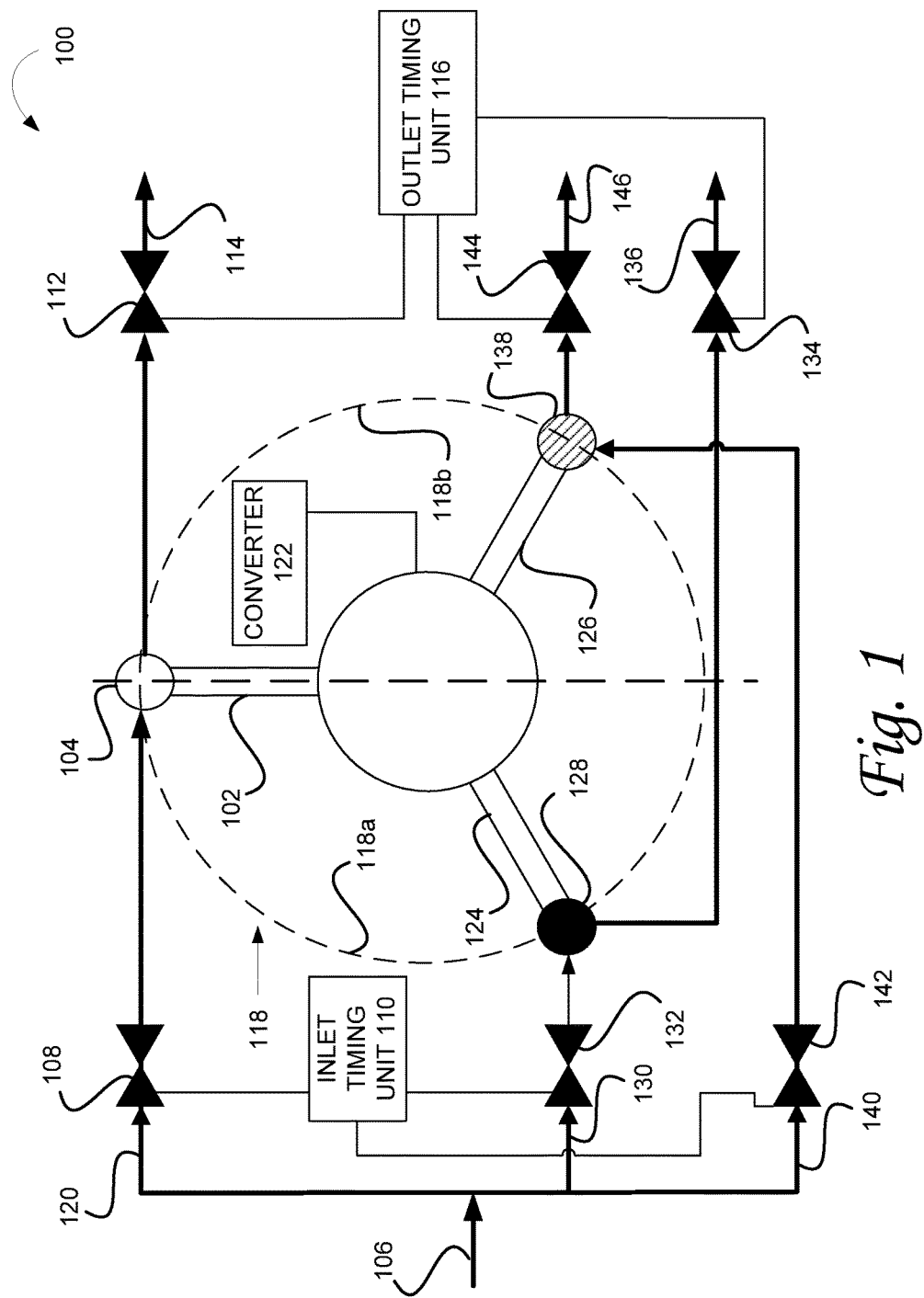
FIG. 1 is a schematic drawings exemplifying a turbine of the present invention.

FIG. 1 is a schematic drawing exemplifying a turbine 100 of the present invention.

The turbine 100 includes at least a first vane 102 joined to a corresponding first balloon 104, an inlet 106, at least a first inlet valve 108, an inlet timing unit 110, at least a first outlet valve 112, at least a first outlet 114, and an outlet timing unit 116. The first vane is configured for rotating about a rotation axis or fulcrum of the turbine. As the first vane 102 rotates, the first balloon 104 travels through a circular path 118. The turbine 100 is configured for being at least partially submerged in a liquid, such that the first balloon 104 is submerged during at least part of the circular path 118.

The inlet 106 is configured for receiving a compressed/pumped gas and leading the compressed or pumped gas through a first conduit 120 to the first inlet valve 108. The first inlet valve 108 is selectively actuated by the inlet timing unit 110 to allow passage of the compressed or pumped gas to the first balloon 104 at desired times, in order to inflate the first balloon 104. The first balloon 104 is in fluid communication with the first outlet valve 112, which is selectively actuated by the outlet timing unit 116 to enable the gas to exit the first balloon 104 (thus deflating the first balloon) and be released via the first outlet 114. By selecting suitable times at which the inlet and outlet valves are actuated, the turbine 100 can be caused to rotate in a desired direction (e.g., clockwise). A converter 122 may be associated with the turbine, and is configured for converting at least part of the rotation's kinetic energy into a different form of energy.

The converter 122 may for example be an alternator, which converts the rotation's kinetic energy into alternating or direct electrical current.

A non-limiting example of the selective inflation and deflation of the first balloon 104 will be described. It should be noticed that this example is merely illustrative, and variations of this example are within the scope of the present invention.

The circular path is 118 is divided by its horizontal diameter into a left half 118a and a right half 118b. While the first balloon 104 is immersed in the liquid and is located somewhere within the left half 118a of the circular path, the inlet timing unit 110 actuates the first inlet valve 108 to allow the compressed or pumped gas to reach and inflate the first balloon 104. Thus the buoyancy generated by the presence of a gas in the first balloon propels the first balloon upward. In this manner a first torque on is generated in a first direction (into the page), causing the first vane 102 to rotate in a first direction (clockwise).

In some cases, it may be desirable to provide a minimal desired kinetic energy to be converted by the converter 122. For this purpose, it is desirable to keep the rotational speed of the first vane above a predetermined threshold. Optionally, it may desirable to maximize the rotation of the first vane, in order to produce a maximum amount of energy via the converter 122.

In order to increase the rotational speed, it is desirable to keep the first balloon 104 inflated during most (preferably all) of the first balloon's travel in the submerged part of the left half 118a of the circular path. In order to decrease a slowdown of the clockwise rotation of the turbine, the first balloon 104 is to be in a deflated state during most (preferably all) of the first balloon's travel in the submerged part of the right half 118b of the circular path.

As the first vane 102 rotates, the first balloon 104 reaches a location on the right half 118b of the circular path in which the first balloon 104 comes in contact or is submerged in the liquid. Before this location is reached, or when this location is reached, the outlet timing unit 116 actuates the first outlet valve 112 to allow the gas to leave the first balloon 104 and exit the turbine via the first outlet 114. In this manner, the first balloon 104 is in a deflated state while travelling on the submerged part of the right half 118b of the circular path. In this manner, during the first balloon's travel in the right half 118b of the circular path, a buoyancy that would counter the first balloon's clockwise rotation is not created.

In some cases, it may desirable to keep the rotational speed of the turbine needs below a certain maximal threshold speed. To do this, the turbine 100 may operate in one or both of the following manners: (i) the first balloon 104 may be in its inflated state only in a part of the left half's portion which is submerged; and (ii) the first balloon may be in its inflated or partially inflated state in a part of the right half's portion which is submerged.

In the former manner of operation, a first time interval in which the torque rotating the turbine clockwise is maintained is decreased, thus maintaining the rotational speed below a maximal threshold. In the latter manner of operation, a torque out of the page is created during a second time interval to counter the clockwise rotation, thus preventing the rotational speed to rise above the maximal threshold.

Optionally, the turbine 100 includes a plurality of vanes, each associated with a respective balloon, a respective conduit, a respective inlet valve, a respective outlet valve, and a respective outlet. For example, the turbine 100 may include a second vane 124 and a third vane 126. A second balloon 128 is joined to the second vane 124, and receives compressed or pumped gas which travels thereto from the inlet 106, through a second conduit 130 and a second inlet valve 132. The second balloon 128 is in fluid communication with a second outlet valve 134, which controls flow of the gas from the second balloon to a second outlet 136. A third balloon 138 is joined to the third vane 126, and receives compressed or pumped gas which travels thereto from the inlet 106, through a third conduit 140 and a third inlet valve 142. The third balloon 138 is in fluid communication with a third outlet valve 144, which controls flow of the gas from the third balloon to a third outlet 146. Optionally, the first outlet 114, the second outlet 136, and the third outlet 146 all converge into a single combined outlet which releases the compressed or pumped gas out of the turbine.

The inlet timing unit 110 selectively actuates the first, second, and third inlet valves to control the inflation of the first, second, and third balloons at respective desired times. The outlet timing unit 116 selectively actuates the first, second, and third outlet valves to control the deflation of the first, second, and third balloons at respective desired times.

In a variant, the inlet timing unit 110 is an electronic unit which includes a timer, and effects the actuation of the inlet valves at preset times. In another variant, the inlet timing unit 110 includes a fixed sensor (e.g., infrared sensor), configured for sensing the passage of the vanes through a predefined location, and for effecting the actuation of the inlet valves accordingly. In yet another variant, the inlet timing unit 110 is a mechanical unit, which includes a cam, as will be described below with reference to FIGS. 18-20. The outlet timing unit 116 may be also in any form, like the inlet timing unit 110.

In a variant, each vane and its respective balloon are separate elements joined to each other. In another variant, the vane and its corresponding balloon are cast out of the same material, such as rubber, where the vane is thicker, and therefore resistant to deformation by the insertion the compressed or pumped gas therethrough, while the balloon is thinner and therefore deformable (inflatable) when compressed or pumped gas is driven thereinto. Optionally, one balloon is joined to each vane. Alternatively, a plurality of balloons is joined to each vane.

The inlet and outlet valves may be any kind of valves that can be used for allowing and denying air flow. Such valves may be Poppet valves or spool valves. The inventor has built a prototype of the turbine using a plurality of Poppet valves. However, other kinds of valves may be used.

Before describing FIGS. 2-6 and 7-12, it should be noted that the manners operation of the turbine in these figures are two possible operation aimed at maximizing the rotational speed of the turbine. Other manners of operation may also achieve the same result. It should also be noted that in the non-limiting example of FIGS. 2-6 and 7-13, a turbine with three vanes and three balloons is used. The turbine of the present invention may have any number of vanes/balloons, and the manner in which the turbine is operated may vary according to the number of vanes and balloons it includes. Moreover, the turbine may be operated in other manners, as described above, for example for the purpose of keeping the rotational speed under a certain threshold. Thus, it is to be understood that the manner of operation of the turbine described in the following figures is only used as an illustration of the use of the turbine 100, and does not limit the present invention to this manner of operation alone.

FIGS. 2-6 are schematic drawings illustrating a non-limiting example of an operation of the turbine when the turbine is partially submerged in a liquid, according to some embodiments of the present invention.

Figure 2:
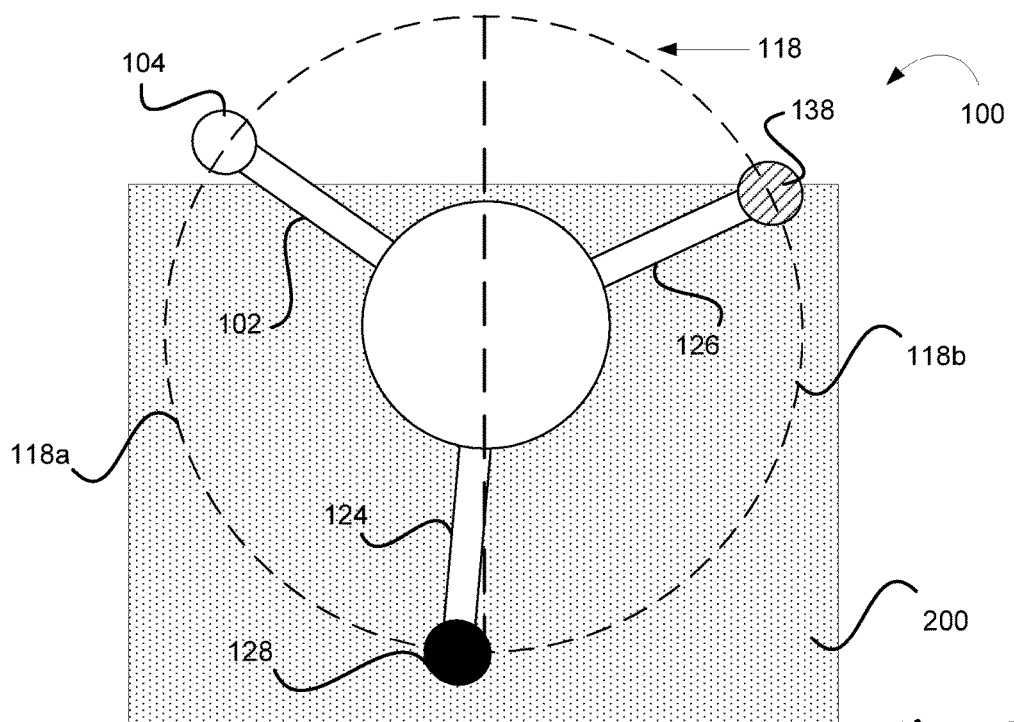
FIGS. 2-6 are schematic drawings illustrating an example of an operation of the turbine when the turbine is partially submerged in a liquid, according to some embodiments of the present invention.

In FIG. 2, a turbine 100 of the present invention (as described in FIG. 1) has a first vane 102, a second vane 124, and a third vane 126, to which a first balloon 104, a second balloon 128, and a third balloon 138 are respectively joined. The turbine 100 is partially submerged in a liquid 200, so that part of the circular path 118 travelled by the balloons is submerged in the liquid 200, and part of the circular path 118 is located outside the liquid 200. In FIG. 2, all balloons are initially in their deflated state.

In FIG. 2, the turbine has not yet started moving. The second balloon 128 is submerged in the liquid 200 and is located on the left half 118a of the circular path. The first balloon 104 is located on the left half 118a and is not submerged. The third balloon 138 is partially submerged in the liquid 200 and is located on the right half 118b of the circular part. In this example, clockwise rotation of the turbine 100 is desired.

Figure 3:
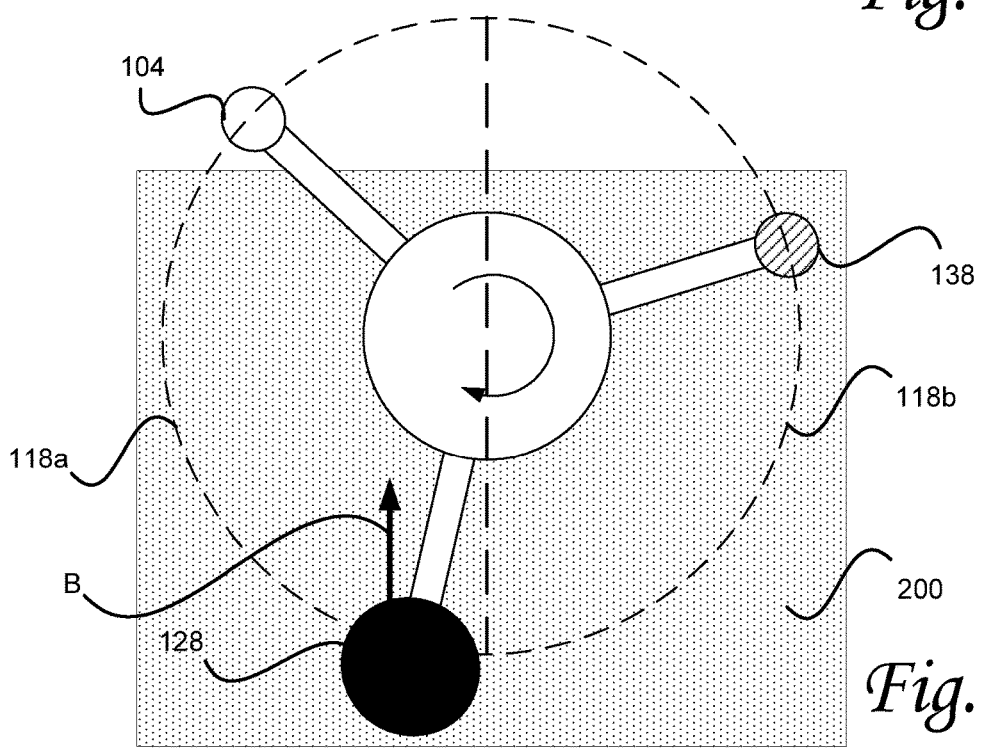

Referring now to FIG. 3, at a first time point, the second balloon 128 is inflated, by actuating the second inlet valve 132 to allow passage of compressed/pumped gas from the inlet to the balloon, while limiting or denying the gas' flow out of the second balloon by keeping the second outlet valve 134 partially open or (preferably) closed. In this manner buoyancy B (an upward-directed force applied on the second balloon) is created and pushes the second balloon 128 upward, thus rotating the turbine 100 clockwise. The first balloon 104 is left deflated, since it is in the air. The third balloon 138 is also left deflated so as not to create buoyancy that would counter the desired clockwise rotation.

Figure 4:
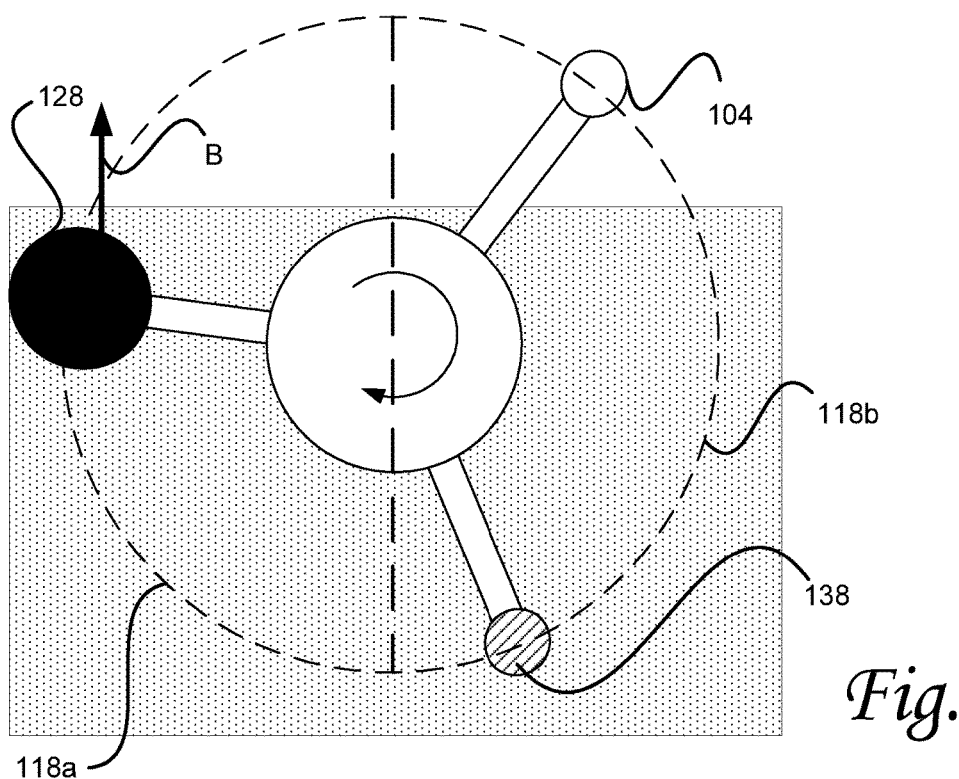

Referring now to FIG. 4, at a second time point following the first time point, the second balloon 128 is still in the submerged section of the left half 118a of the circular path, and is still in maintained inflated to maintain the buoyancy B. The first balloon 104 and the third balloon 138 are still deflated.

Figure 5:
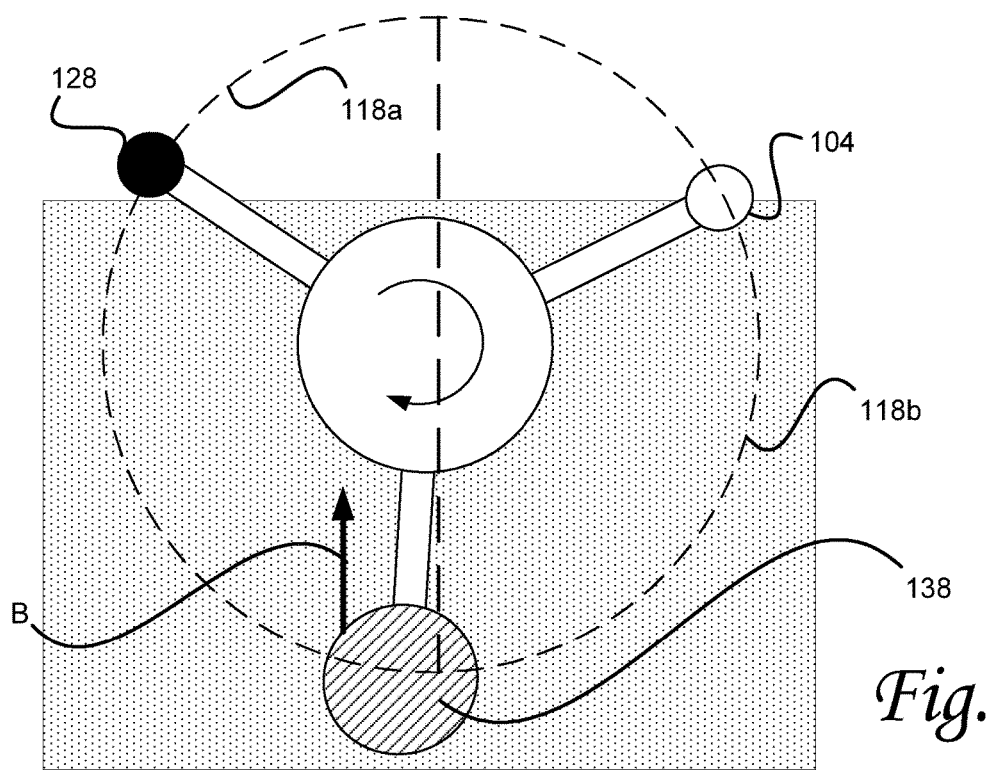

Referring now to FIG. 5, at a third time point following the second time point, the second balloon 128 leaves the liquid 200 and is deflated. This is accomplished by actuating the second valve 134 to allow passage of the compressed or pumped gas from the second balloon to the second outlet, and partially or (preferably) completely closing the second inlet valve 132 to limit or deny the entry of compressed gas or pumped from the inlet to the balloon. It should be noted that the second balloon 128 need not be deflated right after leaving the liquid. For the purposes of this example, it is important that the second balloon be in its deflated state before entering the liquid in the right half 118b of the circular path. It should be also noted that inflation and deflation may be occur instantly or may be performed over a time interval, depending on such factors as the initial pressure of the compressed or pumped gas, the compliance of the balloons, the distance between the inlet and the balloons, the characteristics of the valves used, etc.

The third balloon 138 has crossed to the left half 118a of the circular path and is submerged. Thus, the third balloon 138 is inflated by the manipulation of the third inlet valve 142 and the third outlet valve 144, as described above with regard to the inflation of the second balloon 128 in FIG. 3. The first balloon 104 is about to enter the liquid on the right half 118b of the circular paths, and is thus left deflated, to prevent a buoyancy of the first balloon from countering the clockwise rotation of the turbine 100.

Figure 6:
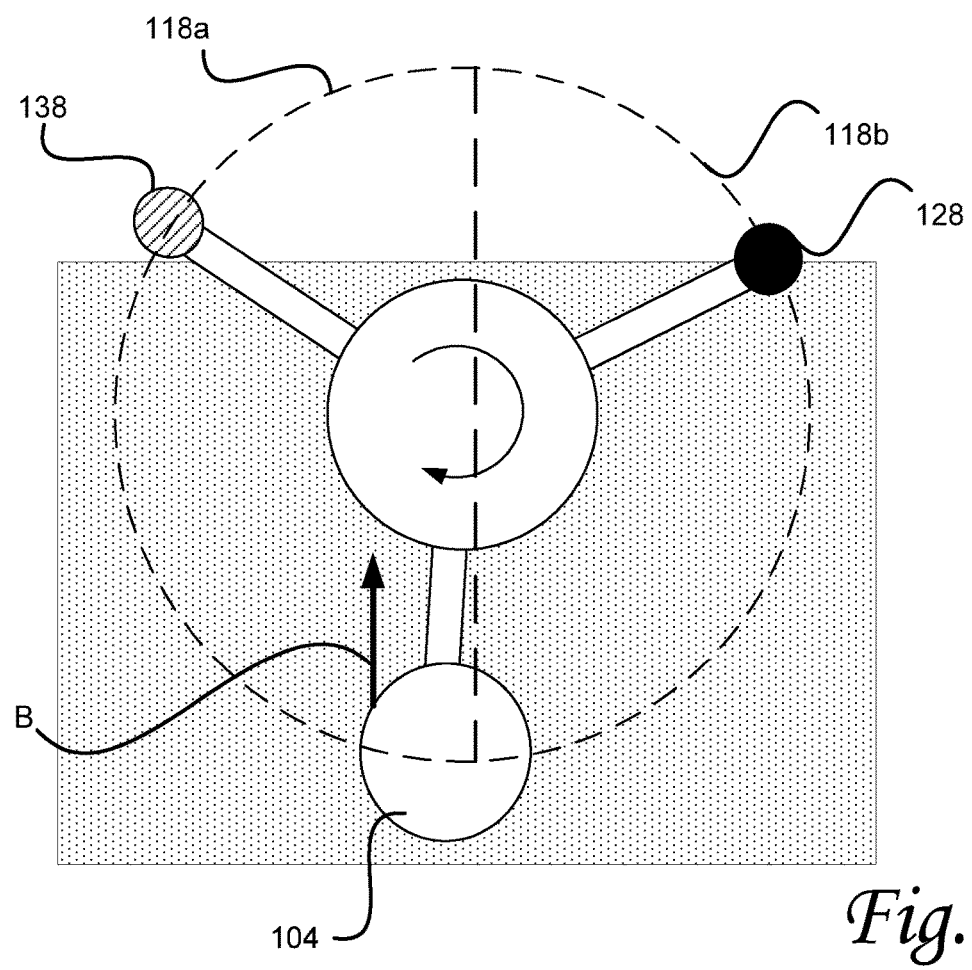

Referring now to FIG. 6, at a fourth time point following the third time point, the third balloon 138 has left the liquid and is deflated, as described above. The first balloon 104 is submerged and has crossed over to the left half 118a of the circular path. Thus, the first balloon is inflated and kept inflated while it is submerged in the left half 118a of the circular path. The second balloon 128 encounters the liquid in the right half 118b of the circular path, and is thus left deflated, to prevent a buoyancy of the second balloon from countering the clockwise rotation of the turbine 100.

After more clockwise rotation has taken place, the balloons return to their positions illustrated in FIG. 2, and the process is repeated.

FIGS. 7-13 are schematic drawings illustrating an example of an operation of the turbine when the turbine is completely submerged in a liquid, according to some embodiments of the present invention.

Figure 7:
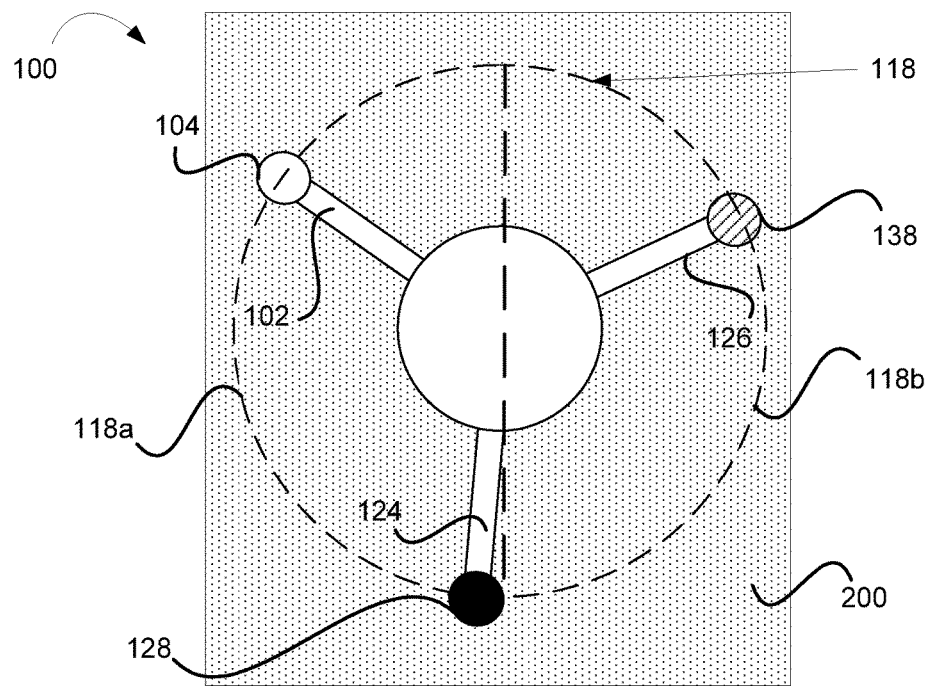
FIGS. 7-13 are schematic drawings illustrating an example of an operation of the turbine when the turbine is completely submerged in a liquid, according to some embodiments of the present invention.

In FIG. 7, a turbine 100 of the present invention (as described in FIG. 1) has a first vane 102, a second vane 124, and a third vane 126, to which a first balloon 104, a second balloon 128, and a third balloon 138 are respectively joined. The turbine 100 is completely submerged in a liquid 200, the whole circular path 118 travelled by the balloons is submerged in the liquid 200. In FIG. 7, all balloons are initially in their deflated state.

In FIG. 7, the turbine has not yet started moving. The first balloon 104 and the second balloon 128 are submerged in the liquid 200 and is located on the left half 118a of the circular path. The third balloon 138 is submerged in the liquid 200 and is located on the right half 118b of the circular part. In this example, clockwise rotation of the turbine 100 is desired.

Figure 8:
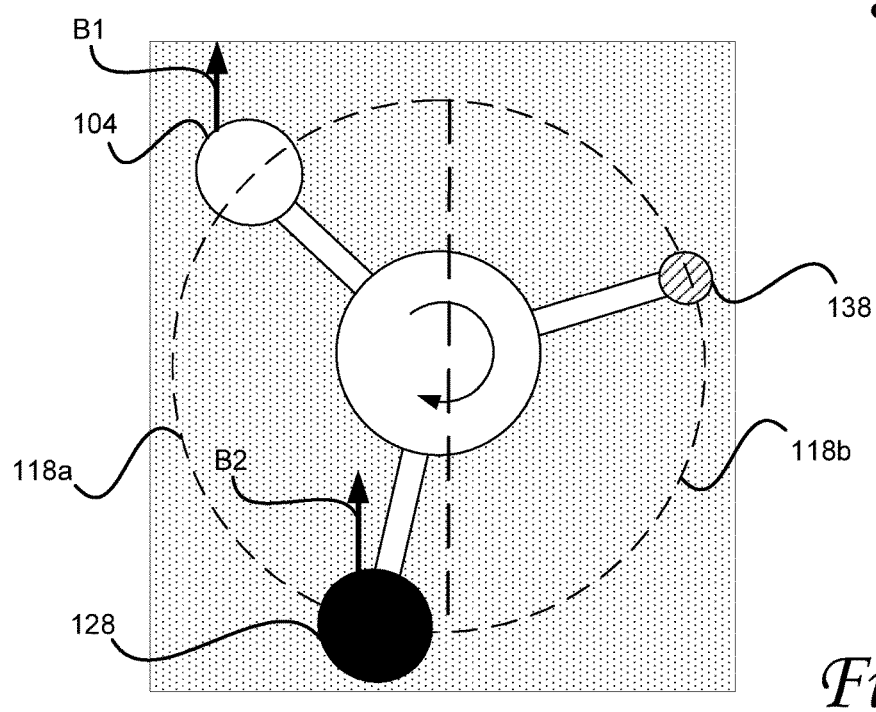

At a first time point, the first balloon 104 and the second balloon 128 are inflated, as shown in FIG. 8. In this manner, buoyancy B1 acting on the first balloon and buoyancy B2 acting on the second balloon are generated and cause the turbine to rotate clockwise. The third balloon 138 is left in its deflated state, so as to prevent creation of a buoyancy that would counter the clockwise rotation of the turbine 100.

Figure 9:
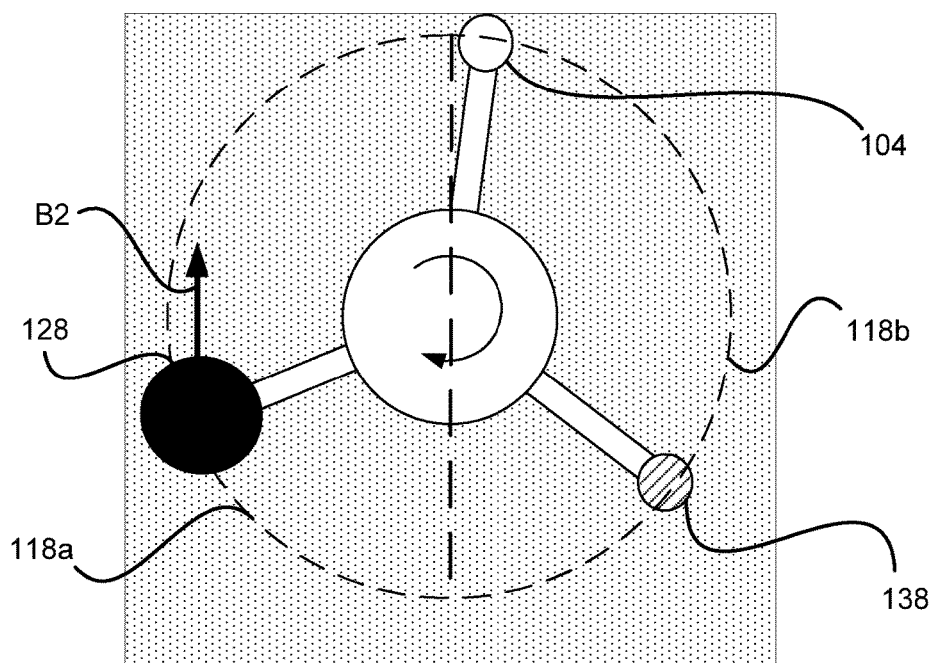

Referring now to FIG. 9, at a second time point following the first time point, the first balloon 104 has crossed to the right half 108b of the circular path and is deflated right away to prevent creation of a buoyancy that would counter the clockwise rotation of the turbine 100. The second balloon 128 is still in the left half 118a of the circular path, and therefore the second balloon is kept inflated to maintain the buoyancy B2, which continues to drive the rotation of the turbine. The third balloon 138 is still in the right half 108b of the circular path, and thus is left deflated.

Figure 10:
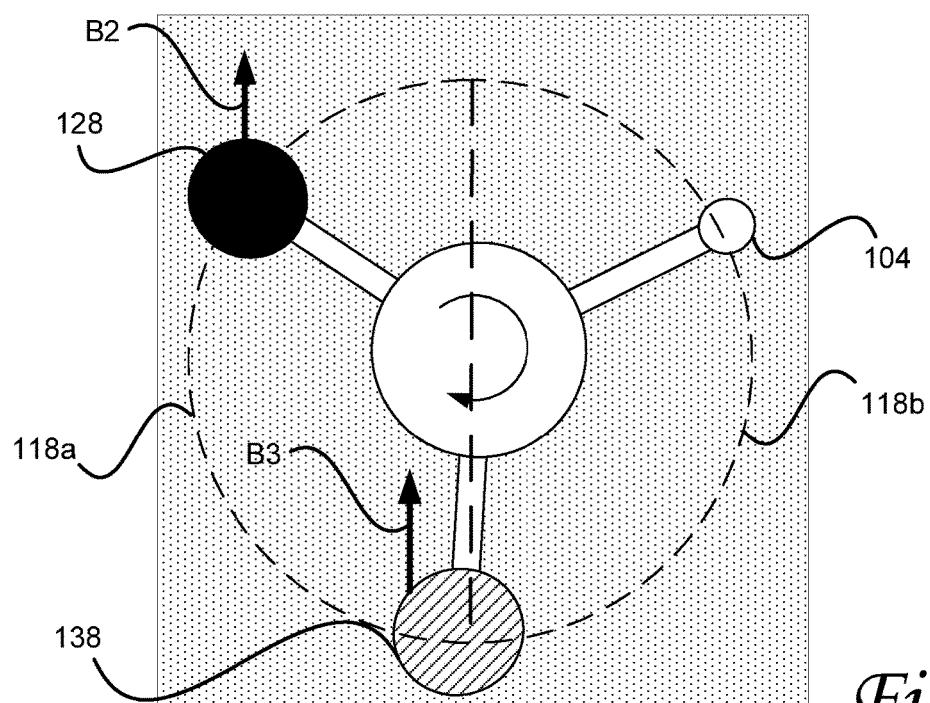

Referring now to FIG. 10, at a third time point following the second time point, the third balloon 138 has crossed to the left half 108a of the circular path. The third balloon 138 is inflated, so that a buoyancy B3 acting on the third balloon pushes the third balloon 138 upward and rotates the turbine clockwise. The second balloon 128 is maintained inflated, so that the buoyancy B2 acting thereon rotates the turbine clockwise. The first balloon 104 located on the right half 108b of the remains deflated, as explained above.

Figure 11:
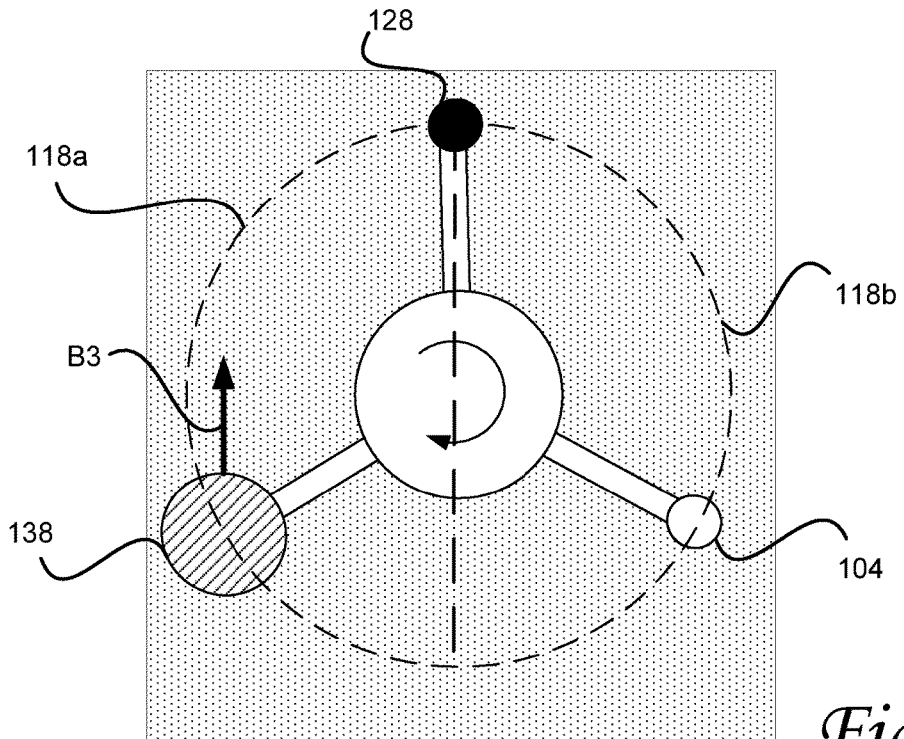

Referring now to FIG. 11, at a fourth time point following the third time point, the second balloon 128 crosses to the right half 118b of the circular path and is right away deflated to prevent its buoyancy from countering the turbine's clockwise rotation. The third balloon 138 is still in the left half 118a of the circular path and is kept inflated to drive the turbine's rotation. The first balloon 104 is kept deflated, since it is on the right half 118b of the circular path.

Figure 12:
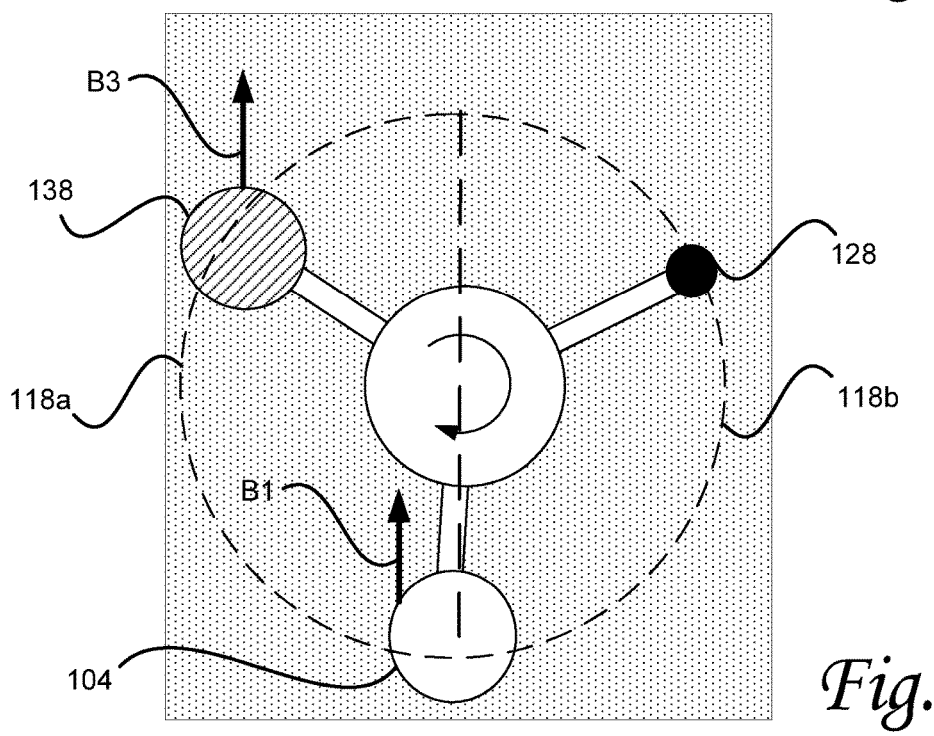

Referring now to FIG. 12, at a fifth time point following the fourth time point, the first balloon 104 has crossed to the left half 118a of the circular path. The first balloon 104 is inflated, so that a buoyancy B1 acting on the first balloon pushes the first balloon 104 upward and rotates the turbine clockwise. The third balloon 138 is maintained inflated, so that the buoyancy B3 acting thereon rotates the turbine clockwise. The second balloon 128 located on the right half 118b of the remains deflated, as explained above.

Figure 13:
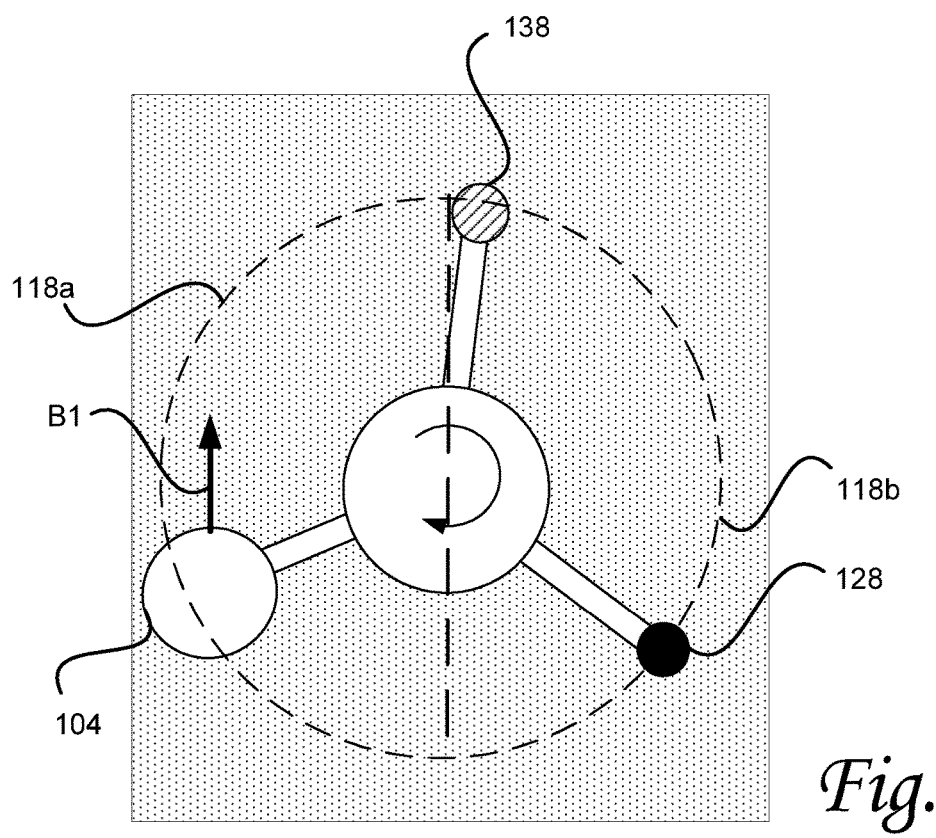

Referring now to FIG. 13, at a sixth time point following the fifth time point, the third balloon 138 crosses to the right half 118b of the circular path and is right away deflated to prevent its buoyancy from countering the turbine's clockwise rotation. The first balloon 104 is still in the left half 118a of the circular path and is kept inflated to drive the turbine's rotation. The second balloon 128 is kept deflated, since it is on the right half 118b of the circular path.

As the clockwise rotation of the turbine continues, the balloons return to the positions they held in the first time point (FIG. 8), and the process is repeated.

Figure 14:
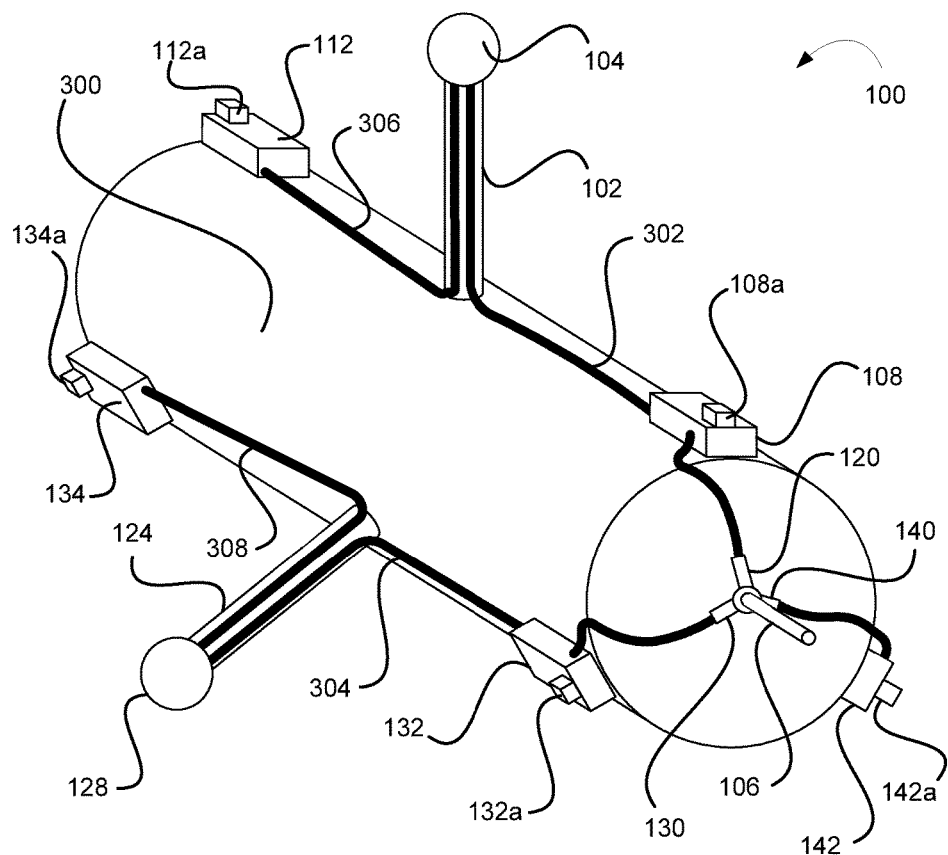
FIG. 14 is a perspective drawing illustrating an example of a configuration of the turbine of the present invention.

FIG. 14 is a perspective drawing illustrating an example of a configuration of the turbine 100 of the present invention.

In the example of FIG. 14, the turbine 100 includes a central body 300. The central body may be cylindrical, but may be in the form of other shapes as well. The first vane 102, the second vane 124, and the third vane (not shown) extend radially away from the cylindrical body. The first balloon 104, the second balloon 128, and the third balloon (not shown) are located at the edges of the corresponding vanes. The inlet 106 receives the compressed or pumped gas and delivers the compressed or pumped gas to a first conduit 120, a second conduit 130, and a third conduit 140. The first, second, and third conduits are in fluid communication with the first, second, and third inlet valves (108, 132, 142) respectively. The inlet valves are located on the outer surface of the central body 300.

The first inlet valve 108 has an actuator 108a, the second inlet valve 132 has an actuator 132a, and the third inlet valve 142 has an actuator 142a. The actuators may be buttons or levers which are configured for being pressed for controlling the gas' flow through the respective inlet valves. The actuators may be electronic or mechanical, for example. The first inlet valve 108 is in fluid communication with the first balloon 104 via a first tube 302. The second inlet valve 132 is in fluid communication with the second balloon 128 via a second tube 304. The third inlet valve 142 is in fluid communication with the third balloon (not shown) via a third tube (not shown).

The first balloon 104 is in fluid communication with the first outlet valve 112 via a fourth tube 306. The second balloon 128 is in fluid communication with the second outlet valve 134 via a fifth tube 308. The third balloon (not shown) is in fluid communication with the third outlet valve (not shown) via a sixth tube (not shown).

The first outlet valve 112 has an actuator 112a, the second outlet valve 134 has an actuator 134a, and the third outlet valve (not shown) has a respective actuator (not shown). The actuators may be buttons or levers which are configured for being pressed for controlling the gas' flow through the respective inlet valves. The actuators may be electronic or mechanical, for example. The outlet valves are located on the outer surface of the central body 300.

As will be shown in the description of FIGS. 21-23 and 24, placing the actuators on the surface of the cylindrical body allows a timing unit in the form of a cam to regulate the opening and closing of the valves.

Figure 15:
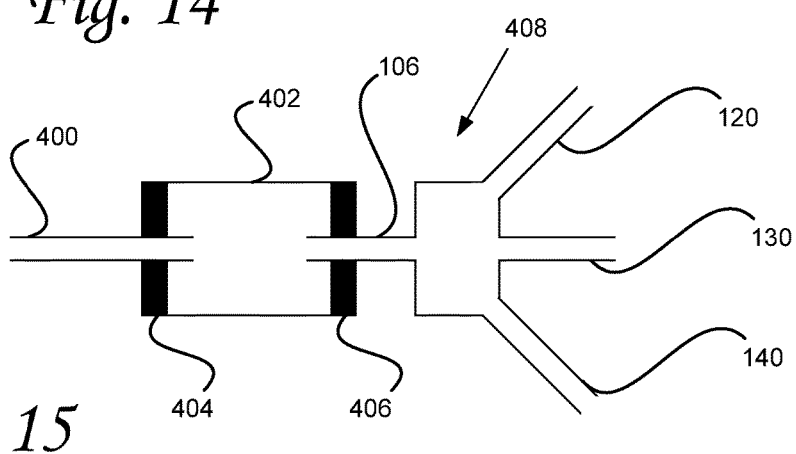
FIG. 15 is a schematic drawing illustrating a detail of the inlet, according to some embodiments of the present invention.

FIG. 15 is a schematic drawing illustrating a detail of the inlet, according to some embodiments of the present invention.

The inlet 106 is configured for receiving the compressed or pumped gas from an outlet 400 of a gas reservoir, or for receiving pumped gas from an outlet 400 of a pump. The outlet 400 of the gas reservoir or the pump does not rotate, while the inlet 106 is configured for rotating with the turbine. Therefore, in some embodiments of the present invention, the turbine includes a hollow connector 402 having a first end and a second end. The connector 402 receives the outlet 400 of the gas reservoir or of the pump at the first end of the connector and receives the inlet 106 at the second end of the connector. The connector 402 may have first and second sealing rings 404 and 406, to surround the outlet 400 and the inlet 106 respectively, to prevent the compressed or pumped gas from escaping. In a non-limiting example, the connector 402 may be a bulkhead connector P5-6 or P5-4 produced by AIGNEP.

The inlet 106 is in fluid communication with the conduits 120, 130, and 140, so as to supply compressed or pumped gas to the first, second, and third balloons selectively. The inlet 106 and the conduits may be part of a single distribution unit 408.

Optionally, in the embodiments in which the outlets converge into a single outlet or in the embodiments in which a single outlet is provided, the outlet is joined to a second connector (not pictured) similar to the first connector 402. The second connector is configured for receiving the rotating outlet at a first end of the second connector and for receiving a non-rotating pipe at the second end of the second connector. The pipe is open to the external environment, thus gas ejected from the outlet traverses the second connector and the tube, and is released from the tube to the external environment.

Figure 16:
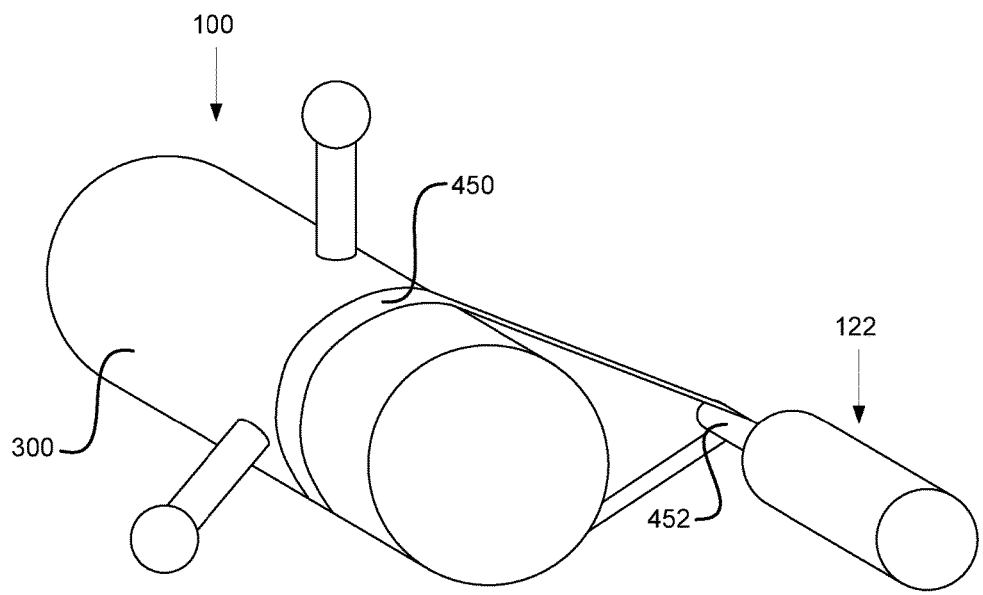
FIGS. 16 and 17 are perspective drawings exemplifying different manners of coupling the turbine of the present invention to an energy converter.
Figure 17:
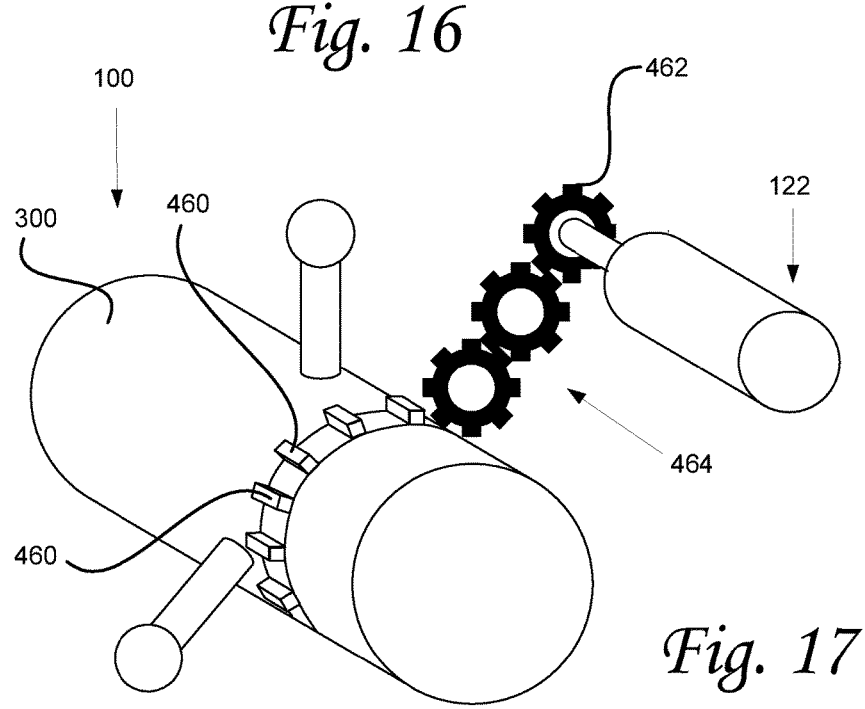

FIGS. 16 and 17 are perspective drawings exemplifying different manners of coupling the turbine of the present invention to an energy converter. In FIG. 16, the turbine is coupled to the energy converter via a belt coupling. In FIG. 17, the turbine is coupled to the energy converter via one or more gears.

In FIGS. 16 and 17 the energy converter 122 is in the form of an electrical energy converter which produces electrical current when rotated, such as a dynamo or an alternator.

In the example of FIG. 16, a belt 450 is wrapped around a portion of the central body 300 of the turbine 100 and around a portion of a shaft 452 of the energy converter 122. When the central body 300 rotates, the belt 450 is caused to rotate around is center. The friction between the belt 450 and the shaft 452 cause the shaft 452 to rotate. As mentioned above the rotation of the shaft of the energy converter generates electrical current.

In the example of FIG. 17 a plurality of teeth (generally 460) extends radially outward along a section of the central body 300. In this manner, the central body 300 is effectively a gear. The energy converter 122 includes a gear 462. The gear 462 is coupled to the gear-like central body 300. In this manner a rotation of the central body causes the rotation of the gear 462, and therefore the shaft of the energy converter 122.

The gear coupling between the energy converter's gear 462 and the turbine's central body 300 may be direct or via a gear pool 464. If the coupling is direct, the teeth of the gear 462 contact the teeth 460 of the central body. If the coupling is via the gear pool 464, the gear pool contacts the teeth of the gear 462 and the teeth 460 of the central body. The gear pool may have one or more gears.

Given a predetermined energy converter with a specific gear and a turbine with a specific central body, the gears of the gear pool 464 can be selected, tweaked, or to provide a desired rotational velocity of the energy converter for a given rotational velocity of the turbine's central body. This is useful, since some energy converters need a minimal rotational velocity in order to produce electrical current, and some energy converters produce maximal electrical current when rotation at a certain rotational velocity of within a range of predetermined rotational velocities.

FIGS. 18 and 19 illustrate a front and a side view of a turbine 100 of the present invention, which is supported by rollers.

In some embodiments of the present invention, the turbine 100 having a cylindrical central body, as described in FIG. 14 may be supported by rollers. The central axis of the cylinder corresponds to the turbine's axis of rotation. The support system includes a first platform 504 holding a first pair of rollers 500 and 502, and a second platform 506 holding a second pair of rollers (of which only the roller 508 is shown in the figure). The platform 504 and 506 are placed at different locations along the length of the cylindrical central body 300, so as not to touch the vanes of the turbine. The height of the platforms is chosen so as to keep the vanes and balloons elevated above ground throughout the rotation of the turbine, so as not to stop or slow down the turbine's rotation. The pairs of rollers are configured for supporting the cylindrical central body 300, to keep the cylindrical central body horizontal, and to enable the central body to rotate about its central axis while offering low friction to the rotation.

Figure 20:
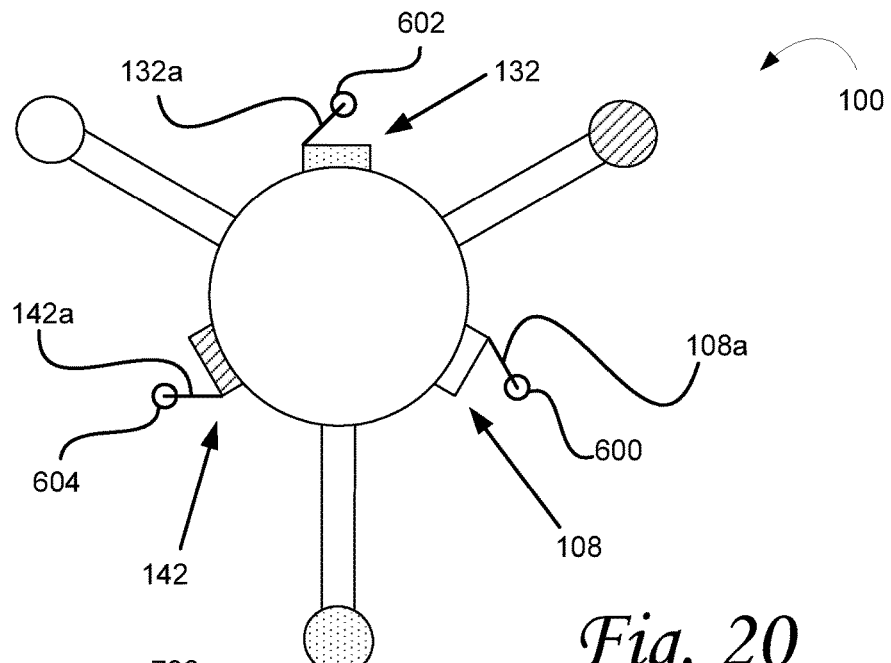
FIG. 20 illustrates a front view of the a turbine of the present invention having valves which are actuated by levers.

FIG. 20 illustrates a front view of a turbine of the present invention having inlet valves which are actuated by levers.

In the example of FIG. 20, each inlet valve (108, 132, 142) includes a respective actuator (108a, 132a, 142a) in the form of a lever. By default, the valve is closed when the lever is not pressed. When a lever is pressed, the valve is opened. When the lever is let go, the lever returns to its original (unpressed) mode and closes the valve. According to a non-limiting example the inlet valves and the outlet valves may be in the form of Pneumax Series 700 Poppet valves 3/2 or Aircomp Pneumatic Valve 2038-5852.

Optionally, rollers are fitted on the edges of the levers. Thus, the first lever 108a is joined to a first roller 600, the second lever 132a is joined to a second roller 602, and the third lever 142a is joined to a third roller 604. As will be explained in the description of FIGS. 21-23 and 24, this configuration enables the valves to be controlled by a timing unit in the form of a cam.

Figure 21:
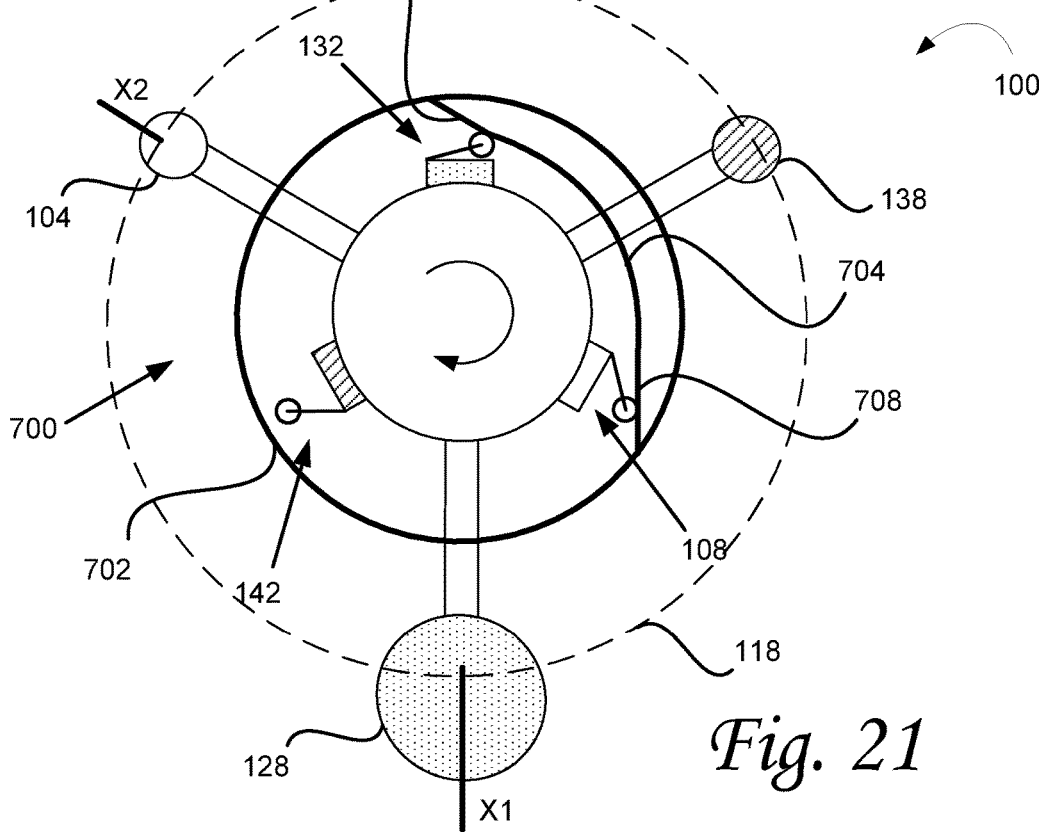
FIGS. 21-23 are schematic drawings illustrating a front view of a turbine of the present invention having an inlet timing system in the form of a first cam, configured for selectively pressing desired levers to actuate the corresponding inlet valves.
Figure 22:
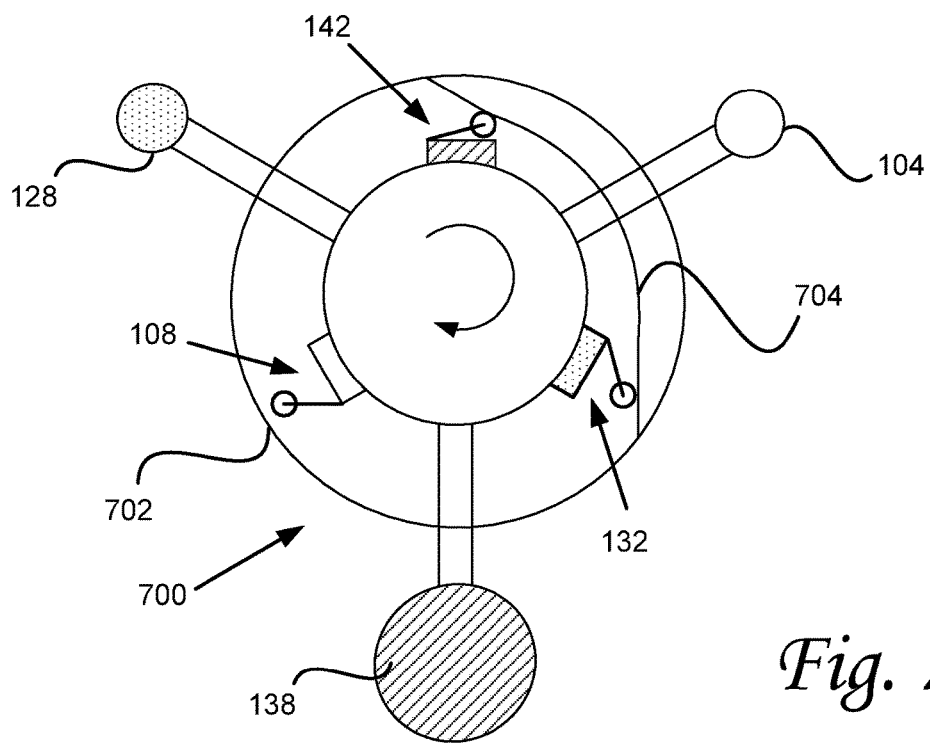
Figure 23:
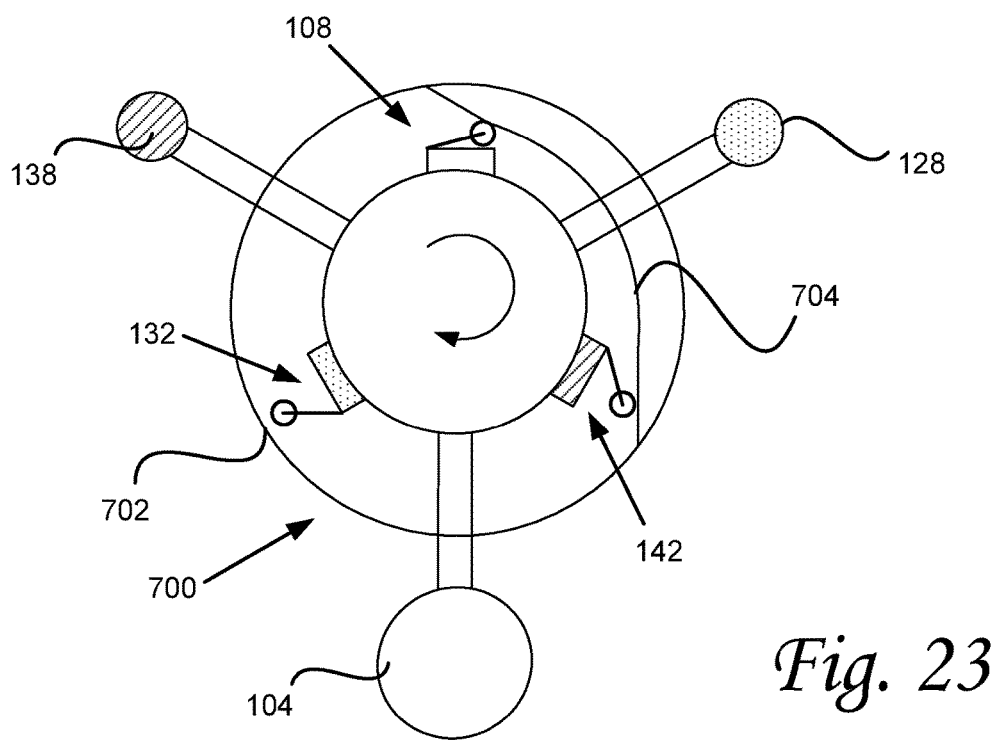

FIGS. 21-23 are schematic drawings illustrating a front view of a turbine of the present invention having an inlet timing system in the form of a first cam, configured for selectively pressing desired levers to actuate the corresponding inlet valves.

In FIGS. 21-23, the first cam 700 has an inner surface, such that, a first portion 702 of the inner surface is circular and a second portion 704 of the inner surface is raised toward the center of the first cam 700. The rollers of the levers of the inlet valves travel through the inner surface of the first cam during the turbine's rotation, so that the levers are pressed when the rollers are in contact with the raised portion 704, and are released when the rollers do not contact the raised portion 704.

In FIGS. 21-23, it is desirable to keep the balloons inflated when they are located at all positions between a first location X1 along the circular path 118 and a second position X2 along the circular path 118. It is also desirable that the balloons be deflated at all other positions. For this purpose, the raised portion 704 of the first cam's inner surface spans an angular interval equal to the angular interval between locations X1 and X2, and is configured for pressing on the levers of inlet valves corresponding to any given balloon when the given balloon is located between location X1 and X2.

Optionally, the passage from the circular portion 702 to the raised portion 704 is gradual. For this purpose a first ramp 706 is located at the beginning of the raised portion. In this manner, the friction between the rollers and the raised portion 704 is decreased if compared to friction generated by an abrupt passage from the circular portion 702 to the raised portion 704. In a variant, the passage from the raised portion 704 to the circular portion 702 is also gradual. For this purpose a second ramp 708 is located at the end of the raised portion 704.

In FIG. 21, the second balloon 128 is at location X1. The roller of the second inlet valve 132 touches the raised portion 704 of the first cam 700, and the lever of the second inlet valve 132 is pressed, enabling the passage of compressed or pumped gas to inflate the second balloon 128. As the second balloon travels toward location X2 due to the buoyancy thus rotating the turbine 100, the lever of the second valve is maintained pressed, to ensure that the second balloon 128 is kept inflated.

In FIG. 22, which is a snapshot taken at a later time, the second balloon 128 has reached the location X2 and contact between the roller of the second inlet valve 132 and the raised portion 704 is lost. The lever of the second inlet valve returns to its original position, closing the second inlet valve and stopping the supply of compressed or pumped gas to the second balloon 128. At the same time, the third balloon 138 reaches X1, and the third inlet valve 142 is actuated as the lever of the third inlet valve 142 is pressed. In this manner, compressed or pumped gas is supplied to the third balloon to inflate the third balloon.

In FIG. 23, which is a snapshot taken after the snapshot of FIG. 22, the third balloon 138 has reached the location X2 and contact between the roller of the third inlet valve 142 and the raised portion 704 is lost. The lever of the third inlet valve returns to its original position, closing the third inlet valve and stopping the supply of compressed or pumped gas to the third balloon 138. At the same time, the first balloon 104 reaches X1, and the first inlet valve 108 is actuated as the lever of the first inlet valve 108 is pressed. In this manner, compressed or pumped gas is supplied to the first balloon to inflate the first balloon.

Figure 24:
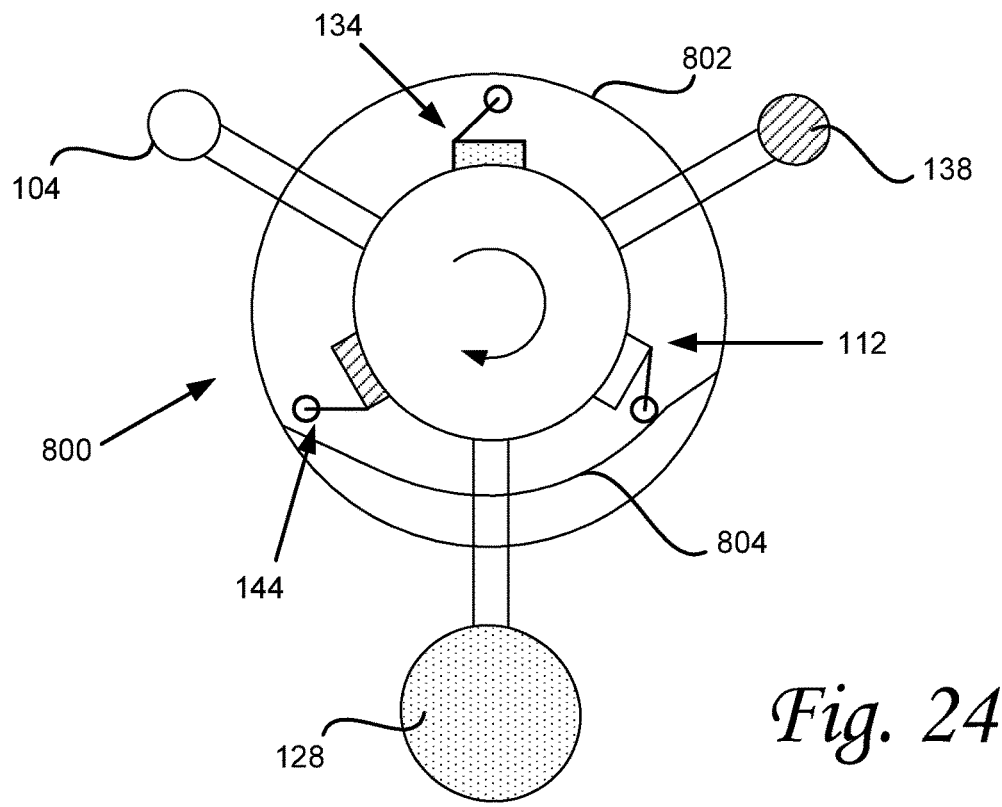
FIG. 24 is a schematic drawing illustrating a rear view of a turbine of the present invention having an outlet timing system in the form of a second cam, configured for selectively pressing desired levers to actuate the corresponding outlet valves.

FIG. 24 is schematic drawing illustrating a front cross-sectional view of a turbine of the present invention having an outlet timing system in the form of a second cam 800, configured for selectively pressing desired levers to actuate the corresponding outlet valves.

The inner surface of the second cam 800 has a circular portion 802 and a portion 804 raised toward the center of the cam. When a roller of an outlet valve comes into contact with the raised portion 804, the outlet valve is opened, allowing gas to flow out of the corresponding balloon toward a corresponding outlet. In this manner the corresponding balloon is deflated.

The angular interval spanned by the raised portion 804 corresponds to an interval which starts at the position (X2 in FIG. 21) along the balloon's circular path at which the deflation of a balloon is supposed to start and ends at a later position (during clockwise location) at which the deflation is complete.

FIG. 24 is simultaneous to FIG. 21. In FIG. 24, the deflation of the first balloon 104 starts. Thus, the roller of first outlet valve 112 comes into contact with the raised portion 804, pressing the lever of the first outlet valve to open the first outlet valve and to allow the compressed or pumped gas to leave the first balloon 104. The first outlet valve will remain pressed for a certain amount of time, to ensure that the balloon is deflated before reaching a location where it is desired that the first balloon is kept deflated (e.g. in the submerged portion of the right half of the circular path, as described above, for example in paragraph [0007]).

Still in FIG. 24, the deflation of the third balloon 138 has been completed, so the third outlet valve 144 is be closed as its roller is no longer is contact with the raised portion 804. The second balloon 128 is to be inflated, so there is no contact between the raised portion 804 and the roller of the second outlet valve 134. In this manner, no compressed or pumped gas escapes the second balloon, enabling the second balloon's inflation when the second inlet valve 132 allows passage of compressed or pumped gas from the inlet into the second balloon 128.

Optionally, as explained above with regard to the first cam, a ramp is be present to smoothen the passage of rollers from the circular portion 802 to the raised portion 804 of the second cam's inner surface. Optionally another ramp is present to smoothen the passage of rollers from the raised portion 804 to the circular portion 802 of the second cam's inner surface.

With respect to FIGS. 21-23 and 24, it should be noted that the inlet cam 700 and the outlet cam 800 may be shaped differently, as long as they open and close their respective valves in desired manner. In fact, the inlet cam 700 may include only a first curved board forming the raised portion 704. The first curved board is located at a desired distance from an axis of rotation of the turbine, such that the rollers of desired inlet valves contact the first curved board when the respective balloons are in desired locations along the circular path. As a given roller travels along the curved board, the roller is pushed toward the axis of rotation, thus pushing the lever of the corresponding inlet valve and actuating (opening) the inlet valve. The outlet cam 800 may have a similar configuration to selectively actuate the outlet valves.

Figure 25:
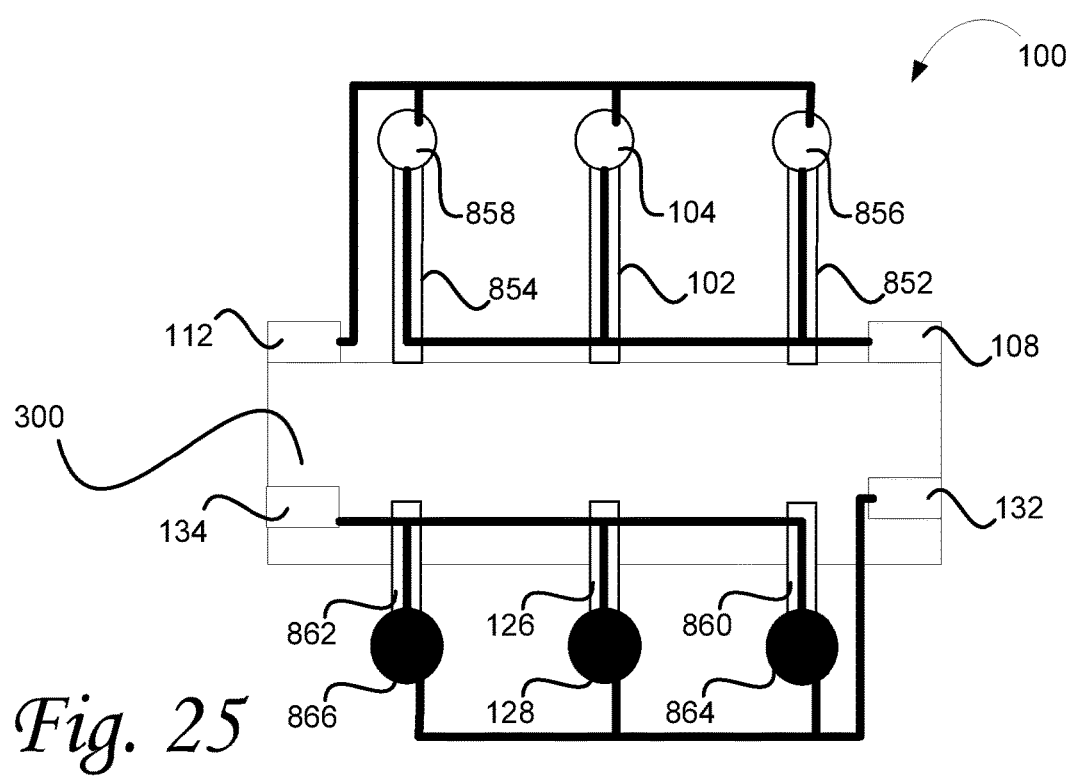
FIG. 25 is a schematic drawing illustrating an embodiment of the present invention, in which the turbine includes multiple sets of vanes.

FIG. 25 is a schematic drawing illustrating an embodiment of the present invention, in which the turbine includes multiple sets of vanes.

In FIG. 25, a side view of the turbine 100 is illustrated. Instead of having one vane for each angular location, as described above, the turbine 100 of the example of FIG. 23 has at least one set of multiple vanes aligned with each other along the central body 300. In each set, the vanes have the same angular orientation with respect to the center of the turbine. Thus, a first set includes the vanes 102, 852, and 854, with their respective first balloons 104, 856, and 858. A second set of vanes includes the vanes 126, 860, and 862 with their respective second balloons 128, 864 and 866.

The balloons joined to vanes belonging to a single set are in fluid communication with the same inlet valve and with the same outlet valve. In this manner, balloons joined to vanes of a single set are inflated and deflated together. Thus, gas passing through the first inlet valve 108 inflates the first set of balloons 104, 856, and 858. Similarly, gas passing through the second inlet valve 132 inflated the second set of balloons 128, 864, and 866. The first set of balloons 104, 856, and 858 are deflated together when the first outlet valve 112 is opened. The second set of balloons 128, 864, and 866 are deflated together when the second outlet valve 134 is opened.

Figure 26:
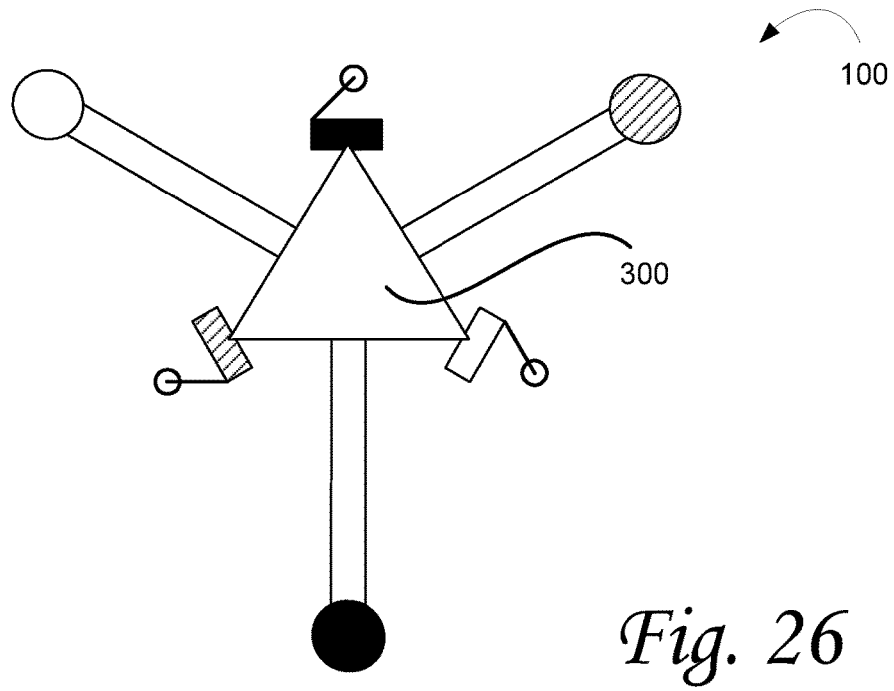
FIGS. 26-27 are schematic drawings illustrating a turbine of the present invention, having a polygonal central body.
Figure 27:
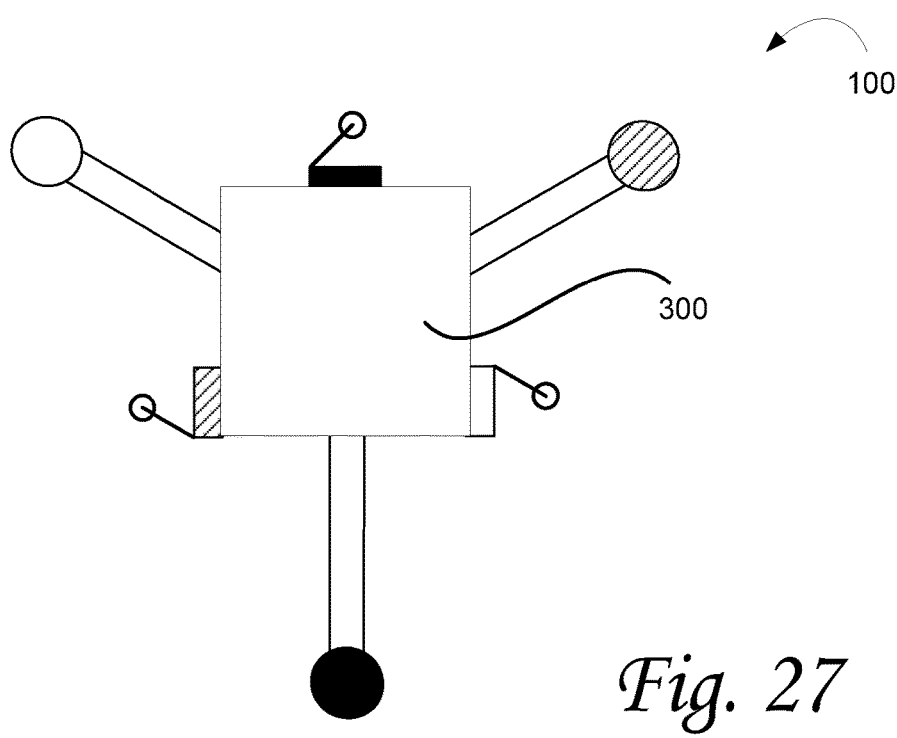

FIGS. 26-27 are schematic drawings illustrating a turbine of the present invention, having a polygonal central body.

As mentioned above, if the turbine 100 of the present application has a central body, the central body may have a polygonal cross section. FIG. 26 illustrates a central body 300 having a triangular cross section. FIG. 27 illustrates a central body 300 having a square cross section.

In the above description of FIGS. 1-27, each vane is associated with a single balloon. It should be noted, however, that the present invention extends to include the embodiments in which a plurality of balloons is joined to at least one of the vanes. In a variant, the inflation of the plurality of balloons joined to one vane may be controlled by a single inlet valve controlling the gas input to all the plurality of balloons simultaneously. The deflation of the plurality of balloons joined to one vane may be controlled by a single outlet valve controlling the gas output from the plurality of balloons simultaneously. In another variant, the inflation and deflation of each balloon of the plurality of balloons joined to one vane are controlled by a respective inlet valve and a respective outlet valves. The inlet valves controlling the inflation of the plurality of balloons joined to one vane may be actuated simultaneously, to simultaneously inflate the plurality of balloons joined to a vane. Similarly, the outlet valves controlling the deflation of the plurality of balloons joined to one vane may be actuated simultaneously, to simultaneously deflate the plurality of balloons joined to a vane.

Figure 28:
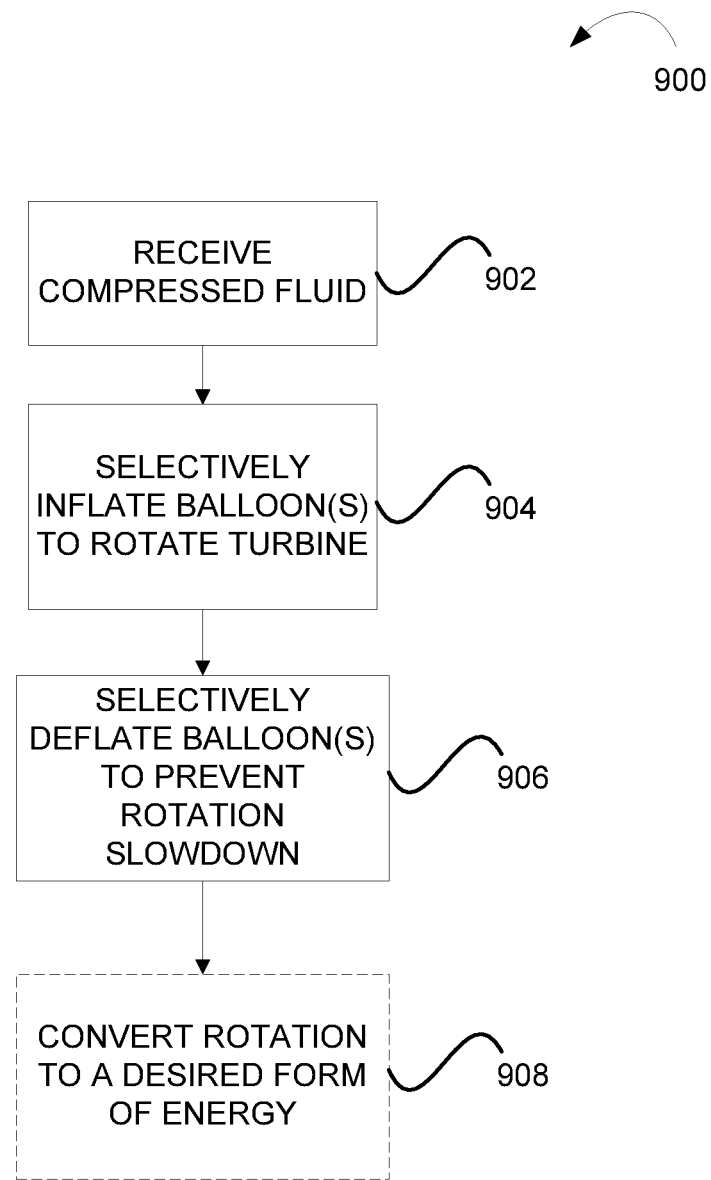
FIG. 28 is a flowchart illustrating a method for rotating a turbine, according to some embodiments of the present invention.

FIG. 28 is a flowchart 900 illustrating a method for rotating a turbine, according to some embodiments of the present invention.

At 902, the turbine 100 as described in any of FIGS. 1-27 receives compressed or pumped gas via an inlet. At 904, one or more balloons are selectively inflated in order to cause the turbine to rotate in a desired direction. At 906, one or more balloons are deflated in order to prevent buoyancy that counters the rotation in the desired direction. Optionally, at 908, the rotation of the turbine is converted to a desired form of energy.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A turbine comprising:
a vane, rotatable about a rotation axis of the turbine;
an inflatable balloon joined to the vane, the balloon tracing a circular path as the vane rotates;
an inlet, configured for receiving gas driven therethrough;
a conduit in fluid communication with the inlet and the balloon, the conduit being configured for leading the gas from the inlet to the balloon to inflate the balloon;
an inlet valve, configured for selectively enabling and preventing passage of the gas through the conduit to the balloon;
an inlet timing unit, configured for selectively actuating the inlet valve to enable passage of the gas to the balloon at one or more first desired times, in order to inflate the balloon at the one or more first desired times;
an outlet in fluid communication with the balloon, for enabling release of the gas from the balloon, in order to deflate the balloon;
an outlet valve configured for selectively enabling and preventing passage of the gas from the balloon to the outlet;
an outlet timing unit, configured for selectively actuating the outlet valve to enable passage of the gas from the balloon to the outlet at one or more second desired times, in order to deflate the balloon at the one or more second desired times;
wherein the inlet valve comprises an actuator in form of a lever, the lever being in a pressed configuration when a force is applied on the lever and for being in an unpressed configuration when no force is applied on the lever;
the inlet valve is configured to be closed preventing passage of the gas from the inlet to the balloon when the lever is in the unpressed configuration, and to be open enabling passage of the gas from the inlet to the balloon when the lever is in the pressed configuration.

2. The turbine of claim 1, wherein:
the turbine is configured for being at least partially submerged in a liquid, such that the balloon is submerged in the liquid when the balloon is located in at least a part of the circular path; and
the inlet timing unit and the outlet timing unit are configured for being synchronized for selectively causing the inflation and deflation of the balloon, in order to selectively generate buoyancy of the balloon in the liquid, the buoyancy being applied to the vane to move the vane, causing a rotation of the turbine.

3. The turbine of claim 1, further comprising a converter configured for converting the rotation of the turbine into a desired form of energy.

4. The turbine of claim 3, wherein the converter comprises an alternator configured for converting the rotation of the turbine into electrical energy.

5. The turbine of claim 1, comprising:
a plurality of vanes having respective orientations with respect to the turbine's axis of rotation;
a plurality of inflatable balloons, each balloon being joined to a respective vane;
a plurality of conduits, each conduit being in fluid communication with the inlet and a respective balloon and configured for leading the gas from the inlet to the respective balloon to inflate the respective balloon;
a plurality of inlet valves, each inlet valve being configured for enabling or preventing passage of the gas through a respective conduit to a respective balloon;

a plurality of outlets in fluid communication with respective balloons, for enabling release of the gas from the respective balloons in order to deflate the respective balloons;

a plurality of outlet valves, each outlet valve being configured for enabling or preventing passage of the gas from a respective balloon to a respective outlet;

wherein:
the inlet timing unit is configured for selectively actuating one or more inlet valves, to enable passage of the gas to one or more balloons at first desired times, in order to inflate one or more balloons at first desired times;

the outlet timing unit is configured for selectively actuating one or more outlet valves, to enable passage of the gas from one or more balloons to one or more outlets at second desired times, in order to deflate one or more balloons at second desired times.

6. The turbine of claim 5, comprising a combined outlet, the plurality of outlets converging into the combined outlet to release the gas from the turbine.

7. The turbine of claim 1 having a central body extending along the turbine's axis of rotation.

8. The turbine of claim 7, comprising:
a set of vanes arranged at spaced apart locations along the central body on an axis parallel to the turbine's axis of rotation, all the vanes of the set having a single angular orientation with respect to the turbine's axis of rotation; and a plurality of inflatable balloons, each balloon being joined to a respective vane;

wherein;
the balloons joined to the vanes of the set are in fluid communication with the inlet valve, such that the inlet valve is configured for selectively enabling and preventing passage of the gas to the plurality of balloons;

the balloons joined to the vanes of the set are in fluid communication with the outlet valve, such that the outlet valve is configured for selectively enabling and preventing passage of the gas from the plurality of balloons to the outlet.

9. The turbine of claim 8, comprising:
a plurality of sets of vanes, each set of vanes being arranged along a respective axis parallel to the turbine's axis of rotation, and the vanes of each set having a respective angular orientation with respect to the turbine's axis of rotation;

a plurality of inflatable balloons, each balloon being joined to a respective vane;

a plurality of inlet valves, each inlet valve corresponding to a respective set, and being configured for enabling or preventing passage of the gas from the conduit to the balloons joined to the vanes of the respective set;

a plurality of outlets, each outlet corresponding to a respective set and being in fluid communication with balloons joined to the vanes of the respective set, the outlets being configured for enabling release of the gas from the respective balloons;

a plurality of outlet valves, each outlet valve corresponding to a respective set and being configured for enabling or preventing passage of the gas from balloons joined to the vanes of the respective set to the respective outlet;

wherein:
the inlet timing unit is configured for selectively actuating one or more inlet valves, in order to inflate the balloons joined to one or more desired sets of vanes at first desired times; and the outlet timing unit is configured for selectively actuating one or more outlet valves, in order to deflate the balloons joined to one or more desired sets of vanes at second desired times.

10. The turbine of claim 7, wherein the central body is cylindrical and the cylindrical central body's central axis corresponds to the turbine's axis of rotation.

11. The turbine of claim 10, comprising a support system, the support system comprising:
a first platform holding a first pair of rollers; and
a second platform holding a second pair of rollers;
wherein the platforms are placed at different location along a length of the cylindrical central body so as not to touch the vane, and the rollers are configured for supporting the central body, to keep the central body horizontal and to enable the central body to rotate about the central body's central axis.

12. The turbine of claim 1, comprising a hollow connector having a first end and a second end, the connector being configured for receiving a non-rotating outlet of a supply of gas via the first end and for receiving the inlet of the turbine via the second end, to enable passage of the gas from the non-rotating outlet to the inlet, which rotates with the turbine.

13. The turbine of claim 1, wherein the inlet timing unit comprises a first cam located in a vicinity of the inlet valve, the first cam comprising a first curved board located at a desired distance from the axis of rotation of the turbine, such that the lever of the inlet valve contacts the first curved board and is pressed by the first curved board to open the inlet valve, when the balloon is in a desired location along the circular path.

14. The turbine of claim 13, wherein the lever is joined to a roller, the roller being configured to roll while traveling along the first curved board.

15. A turbine comprising:
a vane, rotatable about a rotation axis of the turbine;
an inflatable balloon joined to the vane, the balloon tracing a circular path as the vane rotates;
an inlet, configured for receiving gas driven therethrough;
a conduit in fluid communication with the inlet and the balloon, the conduit being configured for leading the gas from the inlet to the balloon to inflate the balloon;
an inlet valve, configured for selectively enabling and preventing passage of the gas through the conduit to the balloon;
an inlet timing unit, configured for selectively actuating the inlet valve to enable passage of the gas to the balloon at one or more first desired times, in order to inflate the balloon at the one or more first desired times;
an outlet in fluid communication with the balloon, for enabling release of the gas from the balloon, in order to deflate the balloon;
an outlet valve configured for selectively enabling and preventing passage of the gas from the balloon to the outlet;
an outlet timing unit, configured for selectively actuating the outlet valve to enable passage of the gas from the balloon to the outlet at one or more second desired times, in order to deflate the balloon at the one or more second desired times;

wherein the outlet valve comprises an actuator in form of a lever, the lever being in a pressed configuration when a force is applied on the lever and for being in an unpressed configuration when no force is applied on the lever;

the outlet valve is configured to be closed preventing passage of the gas from the balloon to the outlet when the lever is in the unpressed configuration, and to be open enabling passage of the gas from the balloon to the outlet when the lever is in the pressed configuration.

16. The turbine of claim 15, wherein the outlet timing unit comprises a second cam located in a vicinity of the outlet valve, the second cam comprising a second curved board located at a desired distance from the axis of rotation of the turbine, such that the lever of the outlet valve contacts the second curved board and is pressed by the second curved board to open the outlet valve, when the balloon is in a desired location along the circular path.

17. The turbine of claim 16, wherein the lever is joined to a roller, the roller being configured to roll while traveling along the second curved board.

18. The turbine of claim 15, wherein:
the turbine is configured for being at least partially submerged in a liquid, such that the balloon is submerged in the liquid when the balloon is located in at least a part of the circular path; and
the inlet timing unit and the outlet timing unit are configured for being synchronized for selectively causing the inflation and deflation of the balloon, in order to selectively generate buoyancy of the balloon in the liquid, the buoyancy being applied to the vane to move the vane, causing a rotation of the turbine.

19. The turbine of claim 15, further comprising a converter configured for converting the rotation of the turbine into a desired form of energy.

20. The turbine of claim 15, having a central body extending along the turbine's axis of rotation, and the turbine comprising:
a set of vanes arranged at spaced apart locations along the central body on an axis parallel to the turbine's axis of rotation, all the vanes of the set having a single angular orientation with respect to the turbine's axis of rotation; and
a plurality of inflatable balloons, each balloon being joined to a respective vane;
wherein:
the balloons joined to the vanes of the set are in fluid communication with the inlet valve, such that the inlet valve is configured for selectively enabling and preventing passage of the gas to the plurality of balloons;
the balloons joined to the vanes of the set are in fluid communication with the outlet valve, such that the outlet valve is configured for selectively enabling and preventing passage of the gas from the plurality of balloons to the outlet.

* * * * *

UNITED STATES PATENT AND TRADEMARK OFFICE
CERTIFICATE OF CORRECTION

PATENT NO. : 9,627,953 B1  
APPLICATION NO. : 13/947068  
DATED : April 18, 2017  
INVENTOR(S) : Gupta It is certified that error appears in the above-identified patent and that said Letters Patent is hereby corrected as shown below:

(72) Inventor: Krishendu Das Gupta to Krishnendu Das Gupta

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*